US009141378B2

(12) United States Patent
Fox et al.

(10) Patent No.: US 9,141,378 B2
(45) Date of Patent: Sep. 22, 2015

(54) METHOD AND SYSTEM FOR EVALUATING A SOFTWARE ARTIFACT BASED ON ISSUE TRACKING AND SOURCE CONTROL INFORMATION

(75) Inventors: Brian Edward Fox, Goffstown, NH (US); Joel Orlina, Silver Spring, MD (US)

(73) Assignee: Sonatype, Inc., Fulton, MD (US)

( * ) Notice: Subject to any disclaimer, the term of this patent is extended or adjusted under 35 U.S.C. 154(b) by 654 days.

(21) Appl. No.: 13/233,265

(22) Filed: Sep. 15, 2011

(65) Prior Publication Data

US 2013/0074038 A1    Mar. 21, 2013

(51) Int. Cl.
*G06F 9/44* (2006.01)
(52) U.S. Cl.
CPC .. *G06F 8/70* (2013.01); *G06F 8/71* (2013.01); *G06F 8/73* (2013.01)
(58) Field of Classification Search
None
See application file for complete search history.

(56) References Cited

U.S. PATENT DOCUMENTS

| | | | |
|---|---|---|---|
| 5,615,400 A | 3/1997 | Cowsar et al. | |
| 6,167,535 A | 12/2000 | Foote et al. | |
| 6,282,698 B1 | 8/2001 | Baker et al. | |
| 6,931,544 B1 | 8/2005 | Kienhofer et al. | |
| 7,080,355 B2 | 7/2006 | Carlson et al. | |
| 7,149,734 B2 | 12/2006 | Carlson et al. | |
| 7,159,206 B1 | 1/2007 | Sadhu et al. | |
| 7,234,131 B1 | 6/2007 | Speyrer et al. | |
| 7,322,024 B2 | 1/2008 | Carlson et al. | |
| 7,340,719 B1 | 3/2008 | Bakerman et al. | |
| 7,343,386 B2 | 3/2008 | Gomes et al. | |
| 7,506,312 B1 * | 3/2009 | Girolami-Rose et al. | .... 717/124 |
| 7,644,101 B2 | 1/2010 | Yano | |
| 7,707,162 B2 | 4/2010 | Naphade et al. | |
| 7,716,636 B2 | 5/2010 | Goncharenko et al. | |
| 7,735,068 B2 | 6/2010 | Siddaramappa et al. | |
| 7,788,632 B2 | 8/2010 | Kuester et al. | |
| 7,810,087 B2 | 10/2010 | O'Brien | |
| 7,814,078 B1 | 10/2010 | Forman et al. | |
| 7,844,592 B2 | 11/2010 | Shoval et al. | |

(Continued)

OTHER PUBLICATIONS

Gall et al., "Visualizing software release histories: the use of color and third dimension," IEEE International Conference on Software Maintenance, 1999 (ICSM '99) Proceedings, pp. 99-108.*

(Continued)

*Primary Examiner* — Thuy Dao
*Assistant Examiner* — Stephen Berman
(74) *Attorney, Agent, or Firm* — Posz Law Group, PLC

(57) ABSTRACT

A computer system includes a transceiver and a processor that is cooperatively operable with the transceiver. The processor gathers, over the transceiver, (i) issue tracking information stored in an issue tracking storage system, the issue tracking information having a history of issues filed against a plurality of artifacts, and (ii) source code management information stored in a source code management storage system, the source code management information having a history of code changes committed against another plurality of artifacts. The processor checks a combined history of the issue tracking information and the source code management information for a history of issues filed against an artifact and a history of commits and corresponding source code changes committed against the artifact. The processor provides an interpretation of the current state of the artifact based on the combined history of the issue tracking information and source code management information about the artifact.

18 Claims, 7 Drawing Sheets

(56) References Cited

U.S. PATENT DOCUMENTS

| | | | |
|---|---|---|---|
| 7,877,391 B2 | 1/2011 | Bird et al. | |
| 7,958,494 B2 | 6/2011 | Chaar et al. | |
| 8,037,453 B1* | 10/2011 | Zawadzki | 717/123 |
| 8,060,871 B2 | 11/2011 | Bernabeu-Auban et al. | |
| 8,069,182 B2 | 11/2011 | Pieper | |
| 8,104,018 B2 | 1/2012 | Chessell et al. | |
| 8,156,092 B2 | 4/2012 | Hewett et al. | |
| 8,156,120 B2 | 4/2012 | Brady | |
| 8,161,470 B2 | 4/2012 | Bottomley et al. | |
| 8,225,281 B1* | 7/2012 | Hardinger et al. | 717/120 |
| 8,280,755 B2 | 10/2012 | Stuhec et al. | |
| 8,296,251 B1 | 10/2012 | Athayde | |
| 8,327,318 B2 | 12/2012 | Chaar et al. | |
| 8,356,278 B2 | 1/2013 | Drissi et al. | |
| 8,359,285 B1 | 1/2013 | Dicker et al. | |
| 8,359,566 B2 | 1/2013 | Chaar et al. | |
| 8,359,571 B2 | 1/2013 | Clemm et al. | |
| 8,438,532 B2 | 5/2013 | Fox et al. | |
| 8,464,205 B2 | 6/2013 | Chaar et al. | |
| 8,473,894 B2 | 6/2013 | Fox et al. | |
| 8,479,159 B2 | 7/2013 | Klinger et al. | |
| 8,479,165 B1* | 7/2013 | Kawashima et al. | 717/124 |
| 8,484,617 B2 | 7/2013 | Goh et al. | |
| 8,484,625 B2 | 7/2013 | Saha et al. | |
| 8,499,284 B2 | 7/2013 | Pich et al. | |
| 8,539,437 B2 | 9/2013 | Finlayson et al. | |
| 8,543,979 B2 | 9/2013 | Arcese et al. | |
| 8,572,550 B2 | 10/2013 | Fox et al. | |
| 8,612,936 B2 | 12/2013 | Fox et al. | |
| 8,627,270 B2 | 1/2014 | Fox et al. | |
| 8,656,343 B2 | 2/2014 | Fox et al. | |
| 8,745,572 B2 | 6/2014 | Zimmermann et al. | |
| 8,856,724 B2 | 10/2014 | Somani et al. | |
| 8,875,090 B2 | 10/2014 | Fox et al. | |
| 9,043,753 B2 | 5/2015 | Fox et al. | |
| 2002/0049962 A1* | 4/2002 | Kelbaugh et al. | 717/128 |
| 2002/0052910 A1 | 5/2002 | Bennett et al. | |
| 2002/0059475 A1 | 5/2002 | Baentsch et al. | |
| 2003/0046282 A1 | 3/2003 | Carlson et al. | |
| 2004/0010786 A1 | 1/2004 | Cool et al. | |
| 2004/0039921 A1 | 2/2004 | Chuang | |
| 2004/0046785 A1 | 3/2004 | Keller | |
| 2004/0117413 A1* | 6/2004 | Brown et al. | 707/203 |
| 2004/0230949 A1 | 11/2004 | Talwar et al. | |
| 2004/0243968 A1 | 12/2004 | Hecksel | |
| 2005/0086473 A1 | 4/2005 | Barkley et al. | |
| 2005/0137884 A1 | 6/2005 | Baird | |
| 2005/0204340 A1 | 9/2005 | Ruminer et al. | |
| 2005/0289066 A1 | 12/2005 | Weare | |
| 2006/0020937 A1 | 1/2006 | Schaefer | |
| 2006/0037000 A1 | 2/2006 | Speeter et al. | |
| 2006/0048097 A1 | 3/2006 | Doshi | |
| 2006/0101092 A1* | 5/2006 | Ishida et al. | 707/203 |
| 2006/0149717 A1 | 7/2006 | Bird et al. | |
| 2006/0150153 A1 | 7/2006 | Altman | |
| 2006/0265688 A1 | 11/2006 | Carlson et al. | |
| 2007/0033567 A1 | 2/2007 | Carlson et al. | |
| 2007/0050232 A1 | 3/2007 | Chang et al. | |
| 2007/0061495 A1 | 3/2007 | Cummins et al. | |
| 2007/0061792 A1 | 3/2007 | Atsatt | |
| 2007/0089086 A1 | 4/2007 | Ortloff | |
| 2007/0118899 A1 | 5/2007 | Sridhar et al. | |
| 2007/0143735 A1 | 6/2007 | Clemm et al. | |
| 2007/0250829 A1 | 10/2007 | Hillier et al. | |
| 2007/0277148 A1 | 11/2007 | Venolia | |
| 2008/0028371 A1* | 1/2008 | Brothers et al. | 717/136 |
| 2008/0028378 A1 | 1/2008 | Biswas et al. | |
| 2008/0066050 A1* | 3/2008 | Jain et al. | 717/101 |
| 2008/0127040 A1 | 5/2008 | Barcellona | |
| 2008/0154965 A1 | 6/2008 | Pedersen | |
| 2008/0178154 A1* | 7/2008 | Basler et al. | 717/124 |
| 2008/0229300 A1 | 9/2008 | O'Brien | |
| 2008/0235680 A1 | 9/2008 | Strauss et al. | |
| 2008/0263505 A1 | 10/2008 | StClair et al. | |
| 2008/0270374 A1 | 10/2008 | Li et al. | |
| 2008/0281904 A1* | 11/2008 | Conrad et al. | 709/203 |
| 2008/0307267 A1* | 12/2008 | Chandrasekaran | 714/38 |
| 2008/0313595 A1 | 12/2008 | Boulineau et al. | |
| 2009/0013310 A1 | 1/2009 | Arner et al. | |
| 2009/0055809 A1 | 2/2009 | Campbell | |
| 2009/0064114 A1 | 3/2009 | Bottomley et al. | |
| 2009/0094572 A1 | 4/2009 | Hegde et al. | |
| 2009/0119261 A1 | 5/2009 | Ismalon | |
| 2009/0133006 A1 | 5/2009 | Cheung | |
| 2009/0138843 A1 | 5/2009 | Hinton et al. | |
| 2009/0144698 A1 | 6/2009 | Fanning et al. | |
| 2009/0300404 A1* | 12/2009 | Branson et al. | 714/3 |
| 2009/0307662 A1 | 12/2009 | Ackerman | |
| 2010/0023919 A1 | 1/2010 | Chaar et al. | |
| 2010/0023920 A1 | 1/2010 | Chaar et al. | |
| 2010/0058291 A1 | 3/2010 | Hahn et al. | |
| 2010/0058295 A1 | 3/2010 | Johnson et al. | |
| 2010/0063975 A1 | 3/2010 | Hayes | |
| 2010/0100543 A1 | 4/2010 | Brady | |
| 2010/0106705 A1 | 4/2010 | Rush et al. | |
| 2010/0153920 A1 | 6/2010 | Bonnet | |
| 2010/0211924 A1 | 8/2010 | Begel et al. | |
| 2010/0306730 A9 | 12/2010 | Carlson et al. | |
| 2010/0325602 A1* | 12/2010 | Kraft et al. | 717/103 |
| 2010/0333067 A1 | 12/2010 | Goh et al. | |
| 2011/0010685 A1 | 1/2011 | Sureka et al. | |
| 2011/0023007 A1* | 1/2011 | Chumbley et al. | 717/102 |
| 2011/0023016 A1 | 1/2011 | Khader et al. | |
| 2011/0055186 A1 | 3/2011 | Gopalakrishnan | |
| 2011/0066619 A1 | 3/2011 | Perantatos et al. | |
| 2011/0107301 A1 | 5/2011 | Chan et al. | |
| 2011/0119289 A1 | 5/2011 | Fields et al. | |
| 2011/0137807 A1* | 6/2011 | Cha | 705/300 |
| 2011/0145810 A1 | 6/2011 | Forsyth | |
| 2011/0161938 A1 | 6/2011 | Marum et al. | |
| 2011/0258162 A1 | 10/2011 | Lam | |
| 2011/0289098 A1 | 11/2011 | Oztaskent et al. | |
| 2011/0296396 A1 | 12/2011 | Kurtakov | |
| 2011/0307862 A1 | 12/2011 | Abrams et al. | |
| 2011/0314438 A1* | 12/2011 | Surazski et al. | 717/100 |
| 2012/0011496 A1 | 1/2012 | Shimamura | |
| 2012/0060148 A1 | 3/2012 | Jones et al. | |
| 2012/0110039 A1 | 5/2012 | McKay et al. | |
| 2012/0124547 A1 | 5/2012 | Halbedel | |
| 2012/0144363 A1 | 6/2012 | Bernardini et al. | |
| 2012/0159420 A1 | 6/2012 | Yassin et al. | |
| 2012/0174084 A1 | 7/2012 | Chapman et al. | |
| 2012/0180024 A1 | 7/2012 | Gonzalez et al. | |
| 2012/0246616 A1 | 9/2012 | Frontiero et al. | |
| 2012/0311534 A1 | 12/2012 | Fox et al. | |
| 2012/0317546 A1 | 12/2012 | Arcese et al. | |
| 2012/0324419 A1 | 12/2012 | Roberts et al. | |
| 2012/0331439 A1* | 12/2012 | Zimmermann et al. | 717/101 |
| 2012/0331447 A1 | 12/2012 | Nayak et al. | |
| 2013/0007704 A1 | 1/2013 | Haynes et al. | |
| 2013/0036400 A1 | 2/2013 | Bak et al. | |
| 2013/0047137 A1 | 2/2013 | Bak et al. | |
| 2013/0067426 A1 | 3/2013 | Fox et al. | |
| 2013/0067427 A1 | 3/2013 | Fox et al. | |
| 2013/0191808 A1 | 7/2013 | Fox et al. | |
| 2013/0212562 A1 | 8/2013 | Fox et al. | |
| 2013/0227517 A1 | 8/2013 | Fox et al. | |
| 2013/0311496 A1 | 11/2013 | Fedorenko et al. | |
| 2013/0326469 A1 | 12/2013 | Fox et al. | |
| 2014/0026121 A1 | 1/2014 | Jackson et al. | |
| 2014/0075414 A1 | 3/2014 | Fox et al. | |
| 2014/0101633 A1 | 4/2014 | Fox et al. | |
| 2014/0115562 A1 | 4/2014 | Fox et al. | |
| 2014/0207753 A1 | 7/2014 | Fox et al. | |

OTHER PUBLICATIONS

Williams et al., "Automatic mining of source code repositories to improve bug finding techniques," 2005, IEEE Transactions on Software Engineering (vol. 31, Issue: 6), pp. 466-480.*

Ying et al., "Predicting source code changes by mining change history," 2004, IEEE Transactions on Software Engineering (vol. 30, Issue: 9), pp. 574-586.*

(56) References Cited

OTHER PUBLICATIONS

Storey et al., "TODO or to bug: exploring how task annotations play a role in the work practices of software developers," 2008, Proceedings of the 30th international conference on Software engineering, pp. 251-260.*
U.S. Appl. No. 13/744,542, filed Jan. 18, 2013, Fox et al.
U.S. Appl. No. 13/780,525, filed Feb. 28, 2013, Fox et al.
Cubranic et al., "Hipikat: Recommending Pertinent Software Development Artifacts," 2003, Proceedings of the 25th International Conference on Software Engineering (ICSE '03), pp. 1-11.
Cubranic et al., "Hipikat: A Project Memory for Software Development," IEEE Transactions on Software Engineering, vol. 31, No. 6, Jun. 2005, pp. 446-465.
Notice of Allowance issued by the U.S. Patent Office on Jan. 22, 2013 in connection with related U.S. Appl. No. 13/089,751.
U.S. Appl. No. 13/089,751, filed Apr. 19, 2011, Fox et al.
U.S. Appl. No. 13/151,816, filed Jun. 2, 2011, Fox et al.
U.S. Appl. No. 13/231,162, filed Sep. 13, 2011, Fox et al.
U.S. Appl. No. 13/369,617, filed Feb. 9, 2012, Fox et al.
U.S. Appl. No. 13/861,065, filed Apr. 11, 2013, Fox et al.
Milanovic et al., "Model & Metamodel, Metadata and Document Repository for Software and Data Integration", 2008, MoDELS 2008, LNCS 5301, pp. 416-430, 2008.
Sherman Steven, "A Process-Oriented Ontology for Representing Software Engineering Project Knowledge", 2009, A doctoral dissertation submitted in partial fulfillment of the requirements for the degree of Doctor of Philosophy, Graduate School of Computer and Information Sciences, Nova Southeastern University, pp. 1-244.
Notice of Allowance issued by the U.S. Patent Office on Mar. 15, 2013 in connection with related U.S. Appl. No. 13/483,412.
Office Action issued by the U.S. Patent Office on Apr. 8, 2013 in connection with related U.S. Appl. No. 13/151,816.
Ji et al., "Efficient Interactive Fuzzy Keyword Search", WWW 2009, Apr. 20-24, 2009, ACM 978-1-60558-487-4/09/04, pp. 371-380.
Happel et al., "Potentials and Challenges of Recommendation Systems for Software Development", RSSE '08, Copyright 2008 ACM 978-1-60558-228-3, pp. 11-15.
Maalej et al., "A Lightweight Approach for Knowledge Sharing in Distributed Software Teams", T. Yamaguchi (Ed.): PAKM 2008, LNAI 5345, pp. 14-25.
Office Action issued by the U.S. Patent Office on Apr. 9, 2013 in connection with related U.S. Appl. No. 13/231,162.
Gardler, "Reuse Readiness Rating", 2009, pp. 1-17, downloaded from the Internet on Apr. 1, 2013 from <url>:http://www.oss-watch.ac.uk/resources/reuseReadinessRating.
Open Source Initiative, "Home", May 5, 2010, pp. 1-2, downloaded from the Waybackmachine Internet Archive on Apr. 1, 2013.
U.S. Appl. No. 13/962,122, filed Aug. 8, 2013, Fox et al.
Gacek, "Exploiting Domain Architectures in Software Reuse", 1992, ACM 0-89791-739-1/95/0004, pp. 229-232.
Prieto-Diaz et al., "Classifying Software for Reusability", Jan. 1987, IEEE Software pp. 6-16.
Meling et al., "Storing and Retrieving Software Components: A Component Description Manager", 2000, IEE, pp. 1-11.
Robillard et al., "Recommendation Systems for Software Engineering", IEEE Computer Society, 2010, pp. 80-86.
Duan et al., "Clustering Support for Automated Tracing", ASE '07, Nov. 5-9, 2007, pp. 244-253.
David, "Recommending Software Artifacts from Repository Transactions", IEA/AIE '08 Proceedings of the 21st International conference on Industrial, Engineering and Other Applications of Applied Intelligent Systems: New Frontiers in Applied Artificial Intelligence, 2008, pp. 189-198.
Herbsleb, "Global Software Engineering: The Future of Socio-technical Coordination," 2007, FOSE '07 2007 Future of Software Engineering, pp. 188-198.
Kagdi et al., "A survey and taxonomy of approaches for mining software repositories in the context of software evolution," 2007, Journal of Software Maintenance and Evolution: Reseach and Practice. J. Soft. Maint. Evol.: Res. Pract. 2007; 19:77-131.
Office Action issued by the U.S. Patent Office on Jun. 18, 2013 in related U.S. Appl. No. 13/369,617.
Notice of Allowance issued by the U.S. Patent Office on Jul. 11, 2013 in related U.S. Appl. No. 13/780,525.
Notice of Allowance issued by the U.S. Patent Office on Aug. 14, 2013 in related U.S. Appl. No. 13/151,816.
Notice of Allowance issued by the U.S. Patent Office on Sep. 9, 2013 in related U.S. Appl. No. 13/231,162.
Office Action issued by the U.S. Patent Office on Sep. 24, 2013 in connection with related U.S. Appl. No. 13/476,160.
Office Action issued by the U.S. Patent Office on Oct. 2, 2013 in connection with related U.S. Appl. No. 13/554,335.
Google, classpath-explorer Library which allows discovering classes at runtime, 2008. p. 1, downloaded from the Wayback Machine Internet Archive Sep. 25, 2013.
Cook et al., "An Extensible Framework for Collaborative Software Engineering", 2003, Proceedings of the Tenth Asia-Pacific Software Engineering Conference (APSEC'03), pp. 1-10.
Fitzpatrick et al., "CVS Integration with Notification and Chat: Lightweight Software Team Collaboration," CSCW'06, Nov. 4-8, 2006. pp. 49-58.
Cleland-Huang et al., "Event-Based Traceability for Managing Evolutionary Change," IEEE Transactions on Software Engineering, vol. 29, No. 9, Sep. 2003, pp. 796-810.
Notice of Allowance issued by the U.S. Patent Office on Oct. 4, 2013 in related U.S. Appl. No. 13/369,617.
The International Search Report and the Written Opinion of the International Searching Authority mailed on Oct. 15, 2013 by the International Searching Authority in connection with international application No. PCT/US2013/041785, which corresponds to related U.S. Appl. No. 13/476,160.
Dmitriev. Safe Class and Data Evolution in Large and Long-Lived Java Applications. Mar. 2001. [retrieved on 2013-26] Retrieved from the Internet: <URL:http://citeseerx.ist.psu.edu/viewdoc/download-?doi+10.1.1.6.1812&rep=rep1&type=pdf>, entire document.
Chilowicz et al. Syntax tree fingerprinting: a foundation for source code similarity detection. Sep. 29, 2011. [Retrieved on 2013-26]. Retrieved from the Internet: <URL: http://hal-upec-mlv.archives-ouvertest.fr/doc/00/62/78/11/PDF/HAL.pdf>, entire document.
U.S. Appl. No. 13/476,160, filed May 21, 2012, Fedorenko et al.
U.S. Appl. No. 13/483,412, filed May 30, 2012, Fox et al.
U.S. Appl. No. 13/554,335, filed Jul. 20, 2010, Jackson et al.
Sourceforge, List of Current OSS Discovery Fingerprints [online] [retrieved on May 27, 2012] Retrieved from the internet: <http://ossdiscovery.sourceforge.net/fingerprints.html>.
Sourceforge, OSS Discovery FAQ [online] [retrieved on May 27, 2012] Retrieved from the internet: <http://ossdiscovery.sourceforge.net/faq.html>.
Notice of Allowance issued by the U.S. Patent Office on Jul. 9, 2014 in related U.S. Appl. No. 13/861,065.
Froehlich et al., "Unifying Artifacts and Activities in a Visual Tool for Distributed Software Development Teams," 2004, Proceedings of the 26th International Conference on Software Engineering, pp. 387-396.
U.S. Appl. No. 14/271,648, filed May 7, 2014, Fedorenko.
Grundy et al., "Inconsistency management for multiple-view software development environments," 1998, IEEE Transactions on Software Engineering, vol. 24, Issue: 11, pp. 960-981.
Han, "Supporting impact analysis and change propagation in software engineering environments," 1997, Proceedings Eight IEEE International Workshop on Software Technology and Engineering Practice incorporating Computer Aided Software Engineering, pp. 172-182.
U.S. Appl. No. 14/140,167, filed Dec. 24, 2013, Fox et al.
Final Office Action issued by the U.S. Patent Office on Feb. 25, 2014 in connection with related U.S. Appl. No. 13/554,335.
Notice of Allowance issued by the U.S. Patent Office on Mar. 20, 2014 in related U.S. Appl. No. 13/476,160.
Siobhan Clark et al., "Verifying components under development at the design stage: A Tool to support the composition of component design models", 1998, Google, 3 pages.
Mili et al., "Storing and Retrieving Software Components: A Refinement Based System", 1994, IEEE, 91-100.

(56) References Cited

OTHER PUBLICATIONS

Office Action issued by the U.S. Patent Office on Nov. 26, 2014 in related U.S. Appl. No. 14/102,713.
International Preliminary Report on Patentability issued by the International Bureau of WIPO on Dec. 4, 2014 in related International application No. PCT/US2013/041785.
Office Action issued by the U.S. Patent Office on Oct. 1, 2014 in connection with related U.S. Appl. No. 13/554,335.
Office Action issued by the U.S. Patent Office on Oct. 7, 2014 in connection with related U.S. Appl. No. 14/078,151.
Office Action issued by the U.S. Patent Office on Oct. 22, 2014 in connection with related U.S. Appl. No. 13/962,122.
Notice of Allowance issued by the U.S. Patent Office on Apr. 27, 2015 in related U.S. Appl. No. 13/962,122.
Podgurski et al., "Retrieving reusable software by sampling behavior", 1993, ACM Transactions on Software Engineering and Methodology, vol. 2, Issue 3, pp. 286-303.
De Luca et al., "Recovering traceability links in software artifact management systems using information retrieval methods", 2007, ACM Transactions on Software Engineering and Methodology, vol. 16, Issue 4, Article No. 13, pp. 1-50.
Ravichandran et al., "Software reuse strategies and component markets", 2003, Communications of the ACM —Program compaction, vol. 46, Issue 8, pp. 109-114.
Notice of Allowance issued by the U.S. Patent Office on May 15, 2015 in related U.S. Appl. No. 13/744,542.
Notice of Allowance issued by the U.S. Patent Office on May 27, 2015 in related U.S. Appl. No. 13/554,335.
Malabarba et al., "Runtime Support for Type-Safe Dynamic Java Classes", 2000, ECOOP 2000—Object-Oriented Programming Lecture Notes in Computer Science, vol. 1850, pp. 337-361.
Liang et al., "Dynamic class loading in the Java virtual machine", 1998, Proceedings of the 13$^{th}$ ACM SIGPLAN conference on Object-oriented programming, systems, languages, and applications, pp. 36-44.
Goldberg et al., "A specification of Java loading and bytecode verification", 1998, Proceedings of the 5$^{th}$ ACM conference on Computer and communications security, pp. 49-58.
Office Action issued by the U.S. Patent Office on Jun. 26, 2015 in related U.S. Appl. No. 14/102,713.

\* cited by examiner

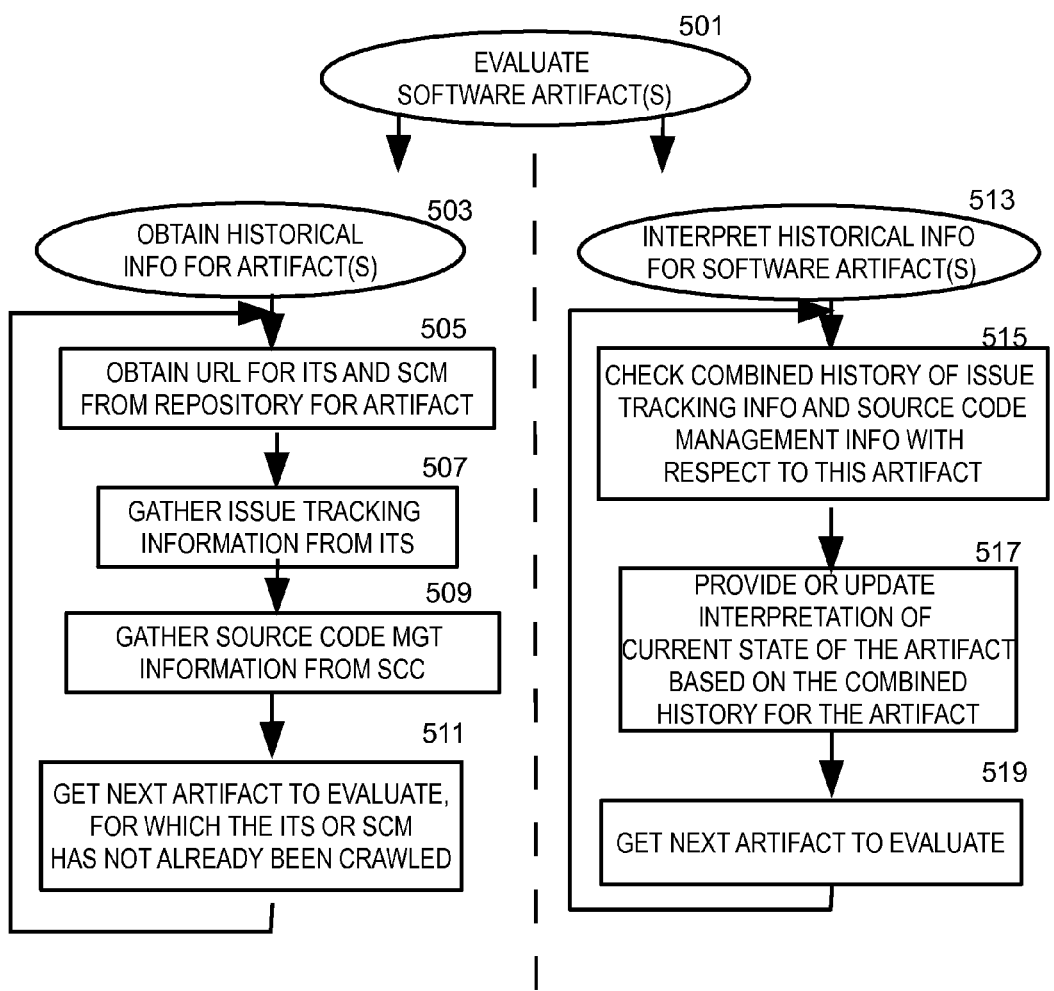

METHOD AND SYSTEM FOR EVALUATING A SOFTWARE ARTIFACT BASED ON ISSUE TRACKING AND SOURCE CONTROL INFORMATION

TECHNICAL FIELD

The technical field relates in general to software development, and more specifically to providing information about software artifacts used in software development.

BACKGROUND

All software developers, in whatever language and platform, whatever methodology, will realize that there is some software that they don't want to write and that already exists. Developers that write their own software conventionally will re-use existing software artifacts as building blocks in writing code within a larger project, so as to avoid re-writing software which already exists.

Conventional systems do not provide a way to identify, evaluate and interpret reports about the quality of artifacts.

As an example of a conventional product that evaluates the quality of artifacts, consider the open source product called "SONAR" that provides quality scores for artifacts, available at nemo.sonarsource.org. SONAR downloads the source code for popular open source projects, and runs tests against the source to provide a SQALE ranking based on source code metrics and testing. This is a very machine-level analysis based on quantifiable software-level code checks such as counting lines of code, counting duplicate lines of code, comments in the code, classes, and the like, and renders a single score. SONAR does a good job of testing machine-level quality but does not look at impact over time. Furthermore, there are a limited number of projects which have been reviewed by the NEMO system.

SUMMARY

Accordingly, one or more embodiments provide a computer system. The computer system includes a transceiver operable to transmit and receive communications over at least a portion of a network; and a processor cooperatively operable with the transceiver. The processor gathers, by communication over the transceiver, (i) issue tracking information stored in an issue tracking storage system, the issue tracking information having a history of issues filed against a plurality of artifacts, and (ii) source code management information stored in a source code management storage system, the source code management information having a history of code changes committed against another plurality of artifacts. Also, the processor checks a combined history of the issue tracking information and the source code management information for a history of issues filed against an artifact and a history of commits and corresponding source code changes committed against the artifact. Also, the processor provides an interpretation of the current state of the artifact based on the combined history of the issue tracking information and source code management information about the artifact.

According to another embodiment, the processor further updates the interpretation of the combined history for the artifact as new issue tracking information and source code management information is obtained.

According to a further embodiment, the interpretation of the current state by the processor is an evaluation of the current stability, so that the processor further determines a stability of the artifact from a periodicity of releases of the artifact in the source code management information and a volume and severity of issues reported for the artifact in the issue tracking information, wherein the artifact is determined to be stable when the artifact has regular periodic releases and fewer than a first predetermined number of severe issues, and the artifact is determined to be not stable when the artifact has more than a second predetermined number of severe issues, the second predetermined number being more than the first predetermined number.

According to yet another embodiment, the processor further obtains an indication of artifacts for which a history is to be interpreted, identifies a software repository of a software project to which each of the artifacts belongs, and obtains an indication of where the issue tracking storage system for each artifact is located from the software repository of the software project to which each artifact belongs.

In accordance with still another embodiment, the processor further obtains an indication of artifacts for which a history is to be interpreted, identifies a software repository of a software project to which each of the artifacts belongs, and obtains an indication of where the source code management storage system for each artifact is located from the software repository of the software project to which each artifact belongs.

According to yet a further embodiment, the processor further determines the artifact which is relevant to one issue report of the issue tracking information based on a detailed explanation provided with the issue report, and determines the artifact which is relevant to one commit in the source code management information based on comments in a commit log associated with the commit.

In accordance with a still further embodiment, the artifact is in stored in the software repository according to the Open Source Definition, the software repository being an open source repository.

Still another embodiment is a non-transitory computer-readable medium comprising instructions for execution by a computer, the instructions including a computer-implemented method for evaluating a software artifact, which includes steps for performing some or all of the foregoing.

Yet another embodiment is a computer-implemented method for evaluating a software artifact, as further summarized above.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 5 is a flow chart illustrating a procedure to evaluate a software artifact.

DETAILED DESCRIPTION

Figure 1:
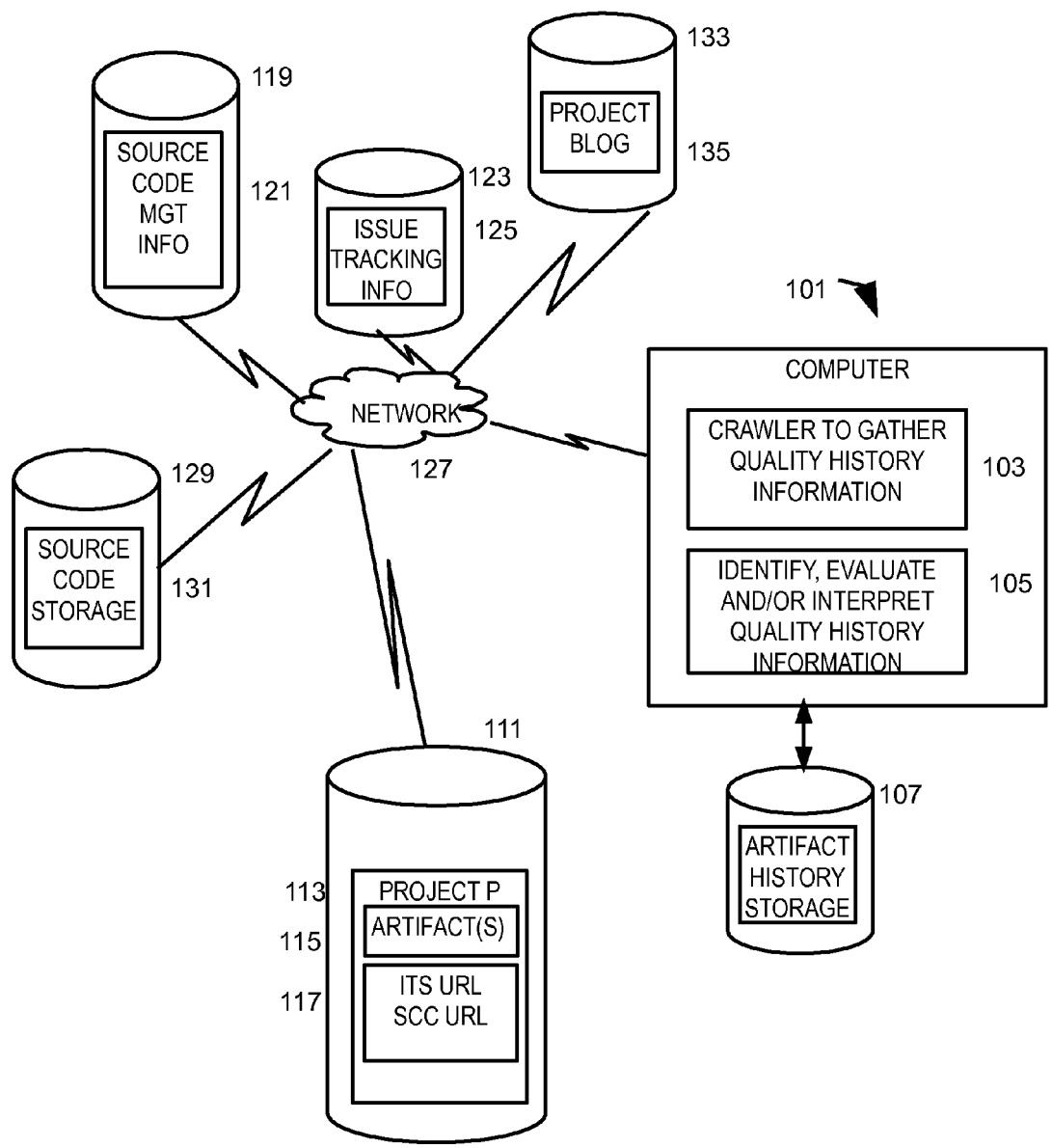
FIG. 1 is a diagram illustrating an environment associated with a computer that evaluates and interprets software artifact lifecycle information.

In overview, the present disclosure concerns software development, in which software code building blocks, sometimes referred to as binary or source code, was released for use as one of plural building blocks to be used in a complete piece of software. Such software development can utilize tools that control issue tracking and/or source code updates to the software code building blocks, for example issue tracking systems and source code management systems. More particularly, various inventive concepts and principles are embodied in systems, devices, and methods to identify, evaluate, and/or interpret quality reports about a software artifact, for example by collecting pre-existing information which is routinely generated in a software life cycle after a piece of software is released, such as issue tracking systems, source code management systems, and the like, and using that information for further evaluation and interpretation.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

DEFINITIONS

The claims use the following terms which are defined to have the following meanings for the purpose of the claims herein.

The term "artifact" or "software artifact" or "software build artifact" used herein is defined to be a specific version of an existing reusable software code building block, which is binary or source code, that has been published, for example as referred to in the open source model, to a publicly available repository, such that it was vetted, approved, indexed so it can be located, and formally released to the public, but is not a complete stand-alone finished product. The term "artifact", "software artifact" or "software build artifact" is not used herein in the broad sense. A concrete example of an artifact is something like, e.g., Hibernate_3, which is an object-relational mapper which allows the JAVA developer to interact with relational database as if using native object oriented code. Its Group ID is org.hibernate, its artifact ID is artifact-core, its version is 3.0. Less formally, the artifact can be understood to be a bit of code which a developer does not wish to write himself/herself and so the developer uses an artifact which is published in a repository. In the MAVEN world, for example, there is a known pre-defined process for publishing an artifact to the MAVEN central web-site or other publicly available repository.

The term "computer system" or "computer" used herein denotes a device sometimes referred to as a computer, laptop, personal computer, personal digital assistant, notebook computer, personal assignment pad, server, client, mainframe computer, variations and equivalents thereof.

The term "issue tracking system" (ITS) or "issue tracking storage system" is defined herein to be a system that manages and maintains a list of issues, including creating, updating and resolving issues about software artifacts, and includes a database that stores the information, and can provide information about existing issues and resolved issue, and records a history of actions taken with regard to issues.

An example of a conventional issue tracking system is JIRA issue tracking system available from Atlassian, Inc., which may be the current defacto standard for issue tracking systems in the JAVA open source community. Other examples of issue tracking systems include Rally, VersionOne, Trac, Bugzilla, and the like.

The term "metadata" is defined to be data that describes the content and context of a file with which it is associated. Metadata that is associated with a software artifact can indicate a project to which the artifact belongs, a security of the artifact or a license that is associated with the artifact, among other things.

"Open source" software is defined herein to be source code that allows distribution as source code as well as compiled form, with a well-publicized and indexed means of obtaining the source, optionally with a license that allows modifications and derived works.

The term "Open Source Definition" is used herein to mean the Open Source Definition available from the Open Source Initiative, variations and evolutions thereof.

The term "project" is used herein to indicate a pre-defined collection of related software artifacts which a group of users maintains; a project can be uniquely identified by a group ID, optionally with artifact ID, optionally with version number. A project has a unique project name, a URL specific to the project, and a sponsoring organization; a project tracks its activity including logging when an artifact in the project is used or updated and the unique identity of the user that used or updated the artifact. Examples of projects include the Mozilla Foundation (sponsoring organization) which maintains the Firefox (project name) web browser, the Eclipse Foundation which maintains the M2Eclipse software, the Apache Software Foundation which maintains Maven, as well as private companies such as Sonatype that maintain their projects such as Sonatype Professional. A project can be a parent or child of another project, in which case the child can inherit group ID, version number, developers and contributors, plugin lists, report lists, plugin executions, and plugin configuration from the parent.

The term "repository" or "software repository" used herein is defined to mean an electronic storage system that stores software build artifacts and dependencies for later retrieval, to which artifacts are published in accordance with procedures which are well known to those in the field, so that artifacts made by one software developer are published to be available for further use by other software developers, to be incorporated as building blocks to build software products which can be executed; a repository can include a computer server by which the stored electronic copies of artifacts are made available for use by software developers to be incorporated as building blocks to build software products which can be executed; the repository has a unique identifier that indicates the software developer (an individual or a group) that contributed the artifact. A repository can be remote or local.

The term "software build" used herein specifically is defined to mean a process as pre-defined in an executable build program of converting a plurality of artifacts obtained from a repository and combining the results into an executable stand-alone computer program or a software artifact for use in a further software build, including at least compiling artifacts and linking compiled artifacts and possibly binary artifacts from the repository, in a pre-determined order as defined in the build program.

The term "source code management system" or "source code management storage system" is specifically defined herein as an application that maintains a list, for a particular software artifact, of commits to that software artifact, comments made with the commit, and the developer responsible for the commit; the artifact may or may not be stored separately from the source code management system.

An example of a source code management system is available at Github.com, which is the hub for people using "Git" as their source code repository management software. Files or other code resources are checked in via the SCM, and the user is required to provide a message with each check-in. The entire history of changes to source code that is checked in is viewable. A user can see how a single file has changed over the lifetime of a piece of software.

The term "user" is defined herein specifically to be a software developer, a line coder, a technical architect, a development lead, or a development manager who is running a team of one or more developers, any of which are working on a software deliverable; or a C-level individual (CIO, CSO, and the like); or an individual that sets or enforces governing standards for software deliverables such as for vulnerability or licensing or artifacts. The term "user" is not used herein in the broad, common sense. The user can be management level because management can have final veto power over the software components in the software deliverable resulting from a project. Typically, but not always, an individual developer will not have the final say over which artifacts are approved.

END OF DEFINITIONS

The inventors faced the problem of making sense of the giant jumble that is open source software, and finding a best artifact for their purposes among the giant jumble of available artifacts. However, the system described herein is applicable to any field of software development where the information is available from which a source or categorization of the artifact can be derived.

A concrete example is open source artifacts that are primarily but not necessarily written in Java. There are hundreds of thousands of artifacts from which a developer can choose, but conventionally there is no set of guideposts to drive a user down a path of proper discovery, beyond traditional searching such as Google searches. Current techniques provide no scoring of artifacts, no ranking, and no set of key terms which are descriptive of one set of artifacts over another.

Conventionally, the process of building an executable computer program from software artifacts can be managed by a build tool, which is a computer program that coordinates and controls other programs to compile and link the various files which together comprise the executable computer program, in the correct order. A build tool can include preprocessing, compilation, linking, packaging, testing, and ultimate distribution of the executable computer program. A project management tool can provide a superset of features found in a build tool, and can facilitate communication among members of a working team. Examples of build tools and project management tools are Maven available at Apache Software Foundation ("Apache"), Apache Ant available from Apache, Buildr available from Apache, Gradle available from Gradle Inc., Apache Ivy, and the like, variations and evolutions thereof. It is assumed that one of skill in this field is generally familiar with "Maven: The Complete Reference" (2010) published by Sonatype, Inc. Mountain View, Calif. which further describes some basic concepts.

As further discussed herein below, various inventive principles and combinations thereof are advantageously employed to help developers that are writing their own software find information about software artifacts, particularly to evaluate a history of the artifact from a combination of resources and to determine the artifact quality from the history which is a combination of resources.

Further in accordance with exemplary embodiments, there is provided a method and system that can crawl remote project systems to identify, evaluate and interpret quality reports. Accordingly, the method or system can review the list of artifacts system, then obtain, from the project sites for each of those whatever information they have about that project, and then further obtain history of issues and commits and present an interpretation of the history back to the users/potential users of that artifact.

Two kinds of metadata have to do with issue tracking systems (ITS) and source code management (SCM) systems. If the artifact is open source, a user is allowed free and unfettered access to both systems. Some non-open source artifacts may also allow access to their ITS and SCM systems. Once the ITS or the SCM system is known for an open source artifact, this metadata is accessible. The history of all of the issues filed against artifacts, the history of all of the code that was written, the commits and all the changes to those artifacts, are all available, at least for open source artifacts.

A repository for POM information may reference information such as SCM and ITS for an artifact. Consequently, a system or method can then access and collect information from the SCM or ITS. Conventional web crawling technology, for example RSS, feed readers, or basic web browsing tools can be used to collect that information. Then, from that collected information from the ITS and SCM, the system and method can glean information from which quality of the artifact can be inferred.

There is a wealth of information that open source developers are routinely storing into publicly accessible storages of information. Because open source developers annotate the work they do with information regarding what was fixed, a system can be created that mines this available collection of information about the fixes. Also, an optional aspect of such a system is rendering all this collected information about fixes into some sort of actionable score.

For example, a comment in an ITS can state which issue number it relates to, and can include a comment, such as "fixed issue #1234;" the issue can be associated with a type of issue, for example, issue #1234 can have an issue type of "critical security vulnerability." The history "fixed issue #1234" in this situation implies that everything prior to that code being checked in or prior to that build is insecure. Hence, every version up to that was insecure, and every version after that should no longer be insecure, at least for that specific vulnerability.

Most source code management mechanisms not only identify the committer but also require a user to add comments when checking in source code, regarding the reason for a commit (such as "fixed a long-standing memory leak"). Hence, even if there is no formal security vulnerability, a user can infer from the source code management system history of commits identifies that an issue that once existed no longer exists. As another example, a commit can identify an issue and a work-around that is provided.

For example, the system herein can determine that the quality of the code is good when the code changes are about once a month (from the source code management system) and there are no critical bugs (from the issue tracking system). On the other hand, the system can determine that a project is volatile because every week there is a new build to fix new bugs reported or perhaps security vulnerabilities. Based on the determination, a developer can decide whether or not to use the artifact.

This information can be conventionally available from ITS and SCM systems. Furthermore, the ability to crawl and acquire data can be implemented using conventionally available techniques. However, the information as a whole is not being leveraged to provide additional insight or a quality evaluation based on the history of the activity, to determine for software developers the quality and stability of an artifact.

The system and method discussed herein provides a way to get much more granular information about an artifact. If the system is only checking status once a year, this could be the problem with the information. What about checking monthly, etc. Is anybody supporting or using the code? If not, that may be why the code has not been touched for a year instead of it being stable. The system can tell how often the code is being accessed and used from a system, which increases the opportunity for problem reports. If only one person used the code, and there are no issue reports, then that is not a strong indicator that the artifact is stable.

To summarize, the system and method herein can look at:

(1) "Issue tracking" ("bug reports" is colloquial)—better referred to as "issue tracking" whether support, or a bug or a new feature. Issue tracking or bug tracking systems are conventional, they can provide an internal workflow. Typically, an issue is assigned (A) an issue tracking number to follow for a lifetime of the issue; (B) descriptor of issue, whether a bug, a feature request, and the like; (C) priority (a/k/a severity) associated with each issue that is created; and (D) detailed explanation and (optional) attachments.

(2) "Source code management". A currently popular source code management system it available at Github.com, which is the hub for people using "Git" as their source code repository management software. Files or other code resources are checked in via the SCM, and the user is required to provide a message with each check-in. The entire history of code that is checked in is viewable. A user can see how a single file has changed over the lifetime of a piece of software. This becomes very powerful when people make reference to their issue track number in the commit log: "I fixed bug #2425 with this commit." If they take the URL in the issue tracker, the system can look up the issue tracker and say this commit fixed a critical issue. There can be a condensed amount of information in the source code management system, and then by accessing the issue tracker the system can obtain a more rich description.

Source code management systems are useful in and of themselves. Even if there is no issue tracker, developers will almost always try to be descriptive of their updates to source code, certainly in the field of open source.

Previously, no one has linked together the capabilities of the ITS and the SCM. The system discussed herein adds the evaluation of the artifact based on the history of both ITS and SCM. In another variation of this system, the ITS and SCM evaluation can be referenced to the licensing and security information for the project to which the artifact belongs as well.

A conventional crawler can crawl these sources, once it is provided with a location to crawl. However, locating the sources that should be crawled to obtain information is not straightforward. Once the sources are determined, the URL for the location can be provided to web crawler which can then be navigated programmatically to the information.

Furthermore, for source code management, the system can download code all (perhaps using a credential) and then mine especially the comments in the source code, perhaps off line. The collection of this information can be automated according to known techniques. The collected information can then be correlated with other bits of data.

The system disclosed herein can include a server that makes a call to the other servers on which the relevant issue tracking and source code management information is stored. Furthermore, the system disclosed herein can calculate the quality score or rating from the history of issue tracking and source code management information.

The system disclosed herein is complicated because of the very large number of data sources. However, the two basic types of data sources are primarily the issue tracker and source code management. Other possible data sources can be a project website, or a project blog, but those sources are less reliable in terms of providing specific insight into what is happening at the code level. The contributors can be gleaned from the source code management, since the identity is sent in with the code ("JoelOrlina changed these lines of code on xxx date.") Between the issue tracking system information and the source code management information, the system can have complete insight into what is happening with source code.

Even though these examples discussed herein are open source, the system can be provided with an internal endpoint and credentials for secured endpoints. The system can be deployed internally or to customers who do not interact with open source software outside as a service. Accordingly, the system can be applied to non-open source systems.

An open source developer can easily have access to more than 250,000 artifacts, and 80% of the artifacts (or their projects) indicate where they keep their issue tracking information and source code management information. From the indication of the locations of the IST and SCM systems, it is possible to crawl the IST system and/or SCM system for one or more of the artifacts, and utilize the extracted information to constitute a high-level score indicating artifact quality that makes sense to people.

According to various aspects, the system can receive a piece of information as it comes in from the crawler or from a real time publication when source code is updated, correlate the information as it comes in to the artifact to which it refers so as to obtain the location of the IST and SCM systems, and crawl out to get the correlated information IST and SCM information from the IST and SCM systems for that artifact. That is, when source code is updated, the system can crawl out to the ITS to figure out what was fixed, why it was fixed, what the issue was, and what the history of fixes is for that particular artifact.

Referring now to FIG. 1, a diagram illustrating an environment associated with a computer that evaluates and interprets software artifact lifecycle information will be discussed and described. In overview, FIG. 1 illustrates a computer 101, a project repository 111, a source code system 129, a source code management system 119, an issue tracking system 123, and a blog system 133. The computer 101 can obtain from the project repository 111, artifact information indicating where lifecycle information is stored. Using the information thus obtained, the computer 101 can obtain information which is naturally generated throughout the lifecycle of the artifact and which indicates the history of the lifecycle of the software artifact from one or more of the source code system 129, source code management system 119, issue tracking system 123, and the blog system 133. Having obtained the lifecycle information indicating a history of the software artifact, the system can interpret the combination of information to reasonably infer the quality of the software artifact.

Note, this figure illustrates only one each of the project repository 111, source code system 129, source code management system 119, issue tracking system 123, and blog system 133; these are representative of any number of each one of these. For example, artifacts can belong to different projects, and different projects may (or may not) use different issue tracking systems and different source code management systems.

The computer 101 can include a crawler 103 to gather quality history information from the illustrated sources of information. The crawler 103 can be conventional, however, the information indicating where to crawl can be obtained from the project repository 111 where the artifact is stored, which conventionally indicates the SCM and ITS for the project for the usual purpose of updating source code and tracking issues. Note that the information which is conventionally indicated in the project repository 111 is used as disclosed herein for a completely different purpose, that is, to infer the quality of the artifact based on the artifact's combined history from these sources. Also, the computer 101 can include code 105 to identify, evaluate and/or interpret quality history information obtained by the crawler as further explained herein. In addition, the computer 101 can summarize and/or store some or all of the information obtained by the crawler 103 and/or the evaluation and/or interpretations which are developed by the code 105 in an artifact history storage 107. The artifact history storage 107 can be local and/or remote. Furthermore, although the crawler 103 and the evaluation code 105 are illustrated as being on the same computer 101, they can be implemented on separate computers and/or distributed among plural computers. The evaluation and/or interpretations which are developed by the code 105 can be provided to a user, such as a developer, to assist in their determination of quality of artifacts in which they are interested.

In this example, the computer accesses the information sources 111, 129, 119, 123, 133 over a network 127.

FIG. 1 illustrates a project repository 111 with Project P 113. The project 113 includes one or more artifacts 115, and the associated locations 117 of the issue tracking system and source code management system to which the artifacts in the project are subject, and other well-understood information which is not illustrated, e.g., project logs. The project logs can be, for example, additional source code managements (e.g., log in, check-in, check-out, update, etc.) and/or additional project issue tracking logs, as is known in the industry.

Also illustrated in FIG. 1 are the source code system 129, the source code management system 119, the issue tracking system 123, and the blog system 133. Without accessing the project repository 111, it can be difficult or impossible to determine which (if any) of these systems is relevant to a particular artifact.

The source code storage system 129 includes a source code storage 131, on which source code is stored according to known techniques. The source code can be obtained from the source code storage 131 and can be parsed to obtain developer comments when available in the source code. This information may be useful, depending on the quality of comments voluntarily provided in the source code by the individual developer.

The source code management system 119 includes a source code management information storage 121, which can be retrieved according to known techniques.

The issue tracking system 123 includes issue tracking information storage 125, which can be retrieved according to known techniques.

The blog system 133 includes a blog 135 concerning the project. Contributions to the blog can be obtained and can be parsed to obtain user comments when available about an artifact. Again, this information may be useful but this depends on the quality of the user comments in the blog.

One premise is that, a software developer wants to be able to use software modules/components (artifacts) that someone else has made publicly available, such as in one or more repositories 111 of one or more projects 113. If the artifacts are open source, they should be free of charge. The developer wants to determine the quality of an artifact they want to use, although information about artifact quality conventionally is anecdotal at best. The present system can provide a method or system to provide a reliable interpretation about artifact quality based on the entire lifecycle history of the artifact. Such an interpretation can be consistent across multiple artifacts, so that the relative quality of artifacts can be consistently compared.

Figure 2:
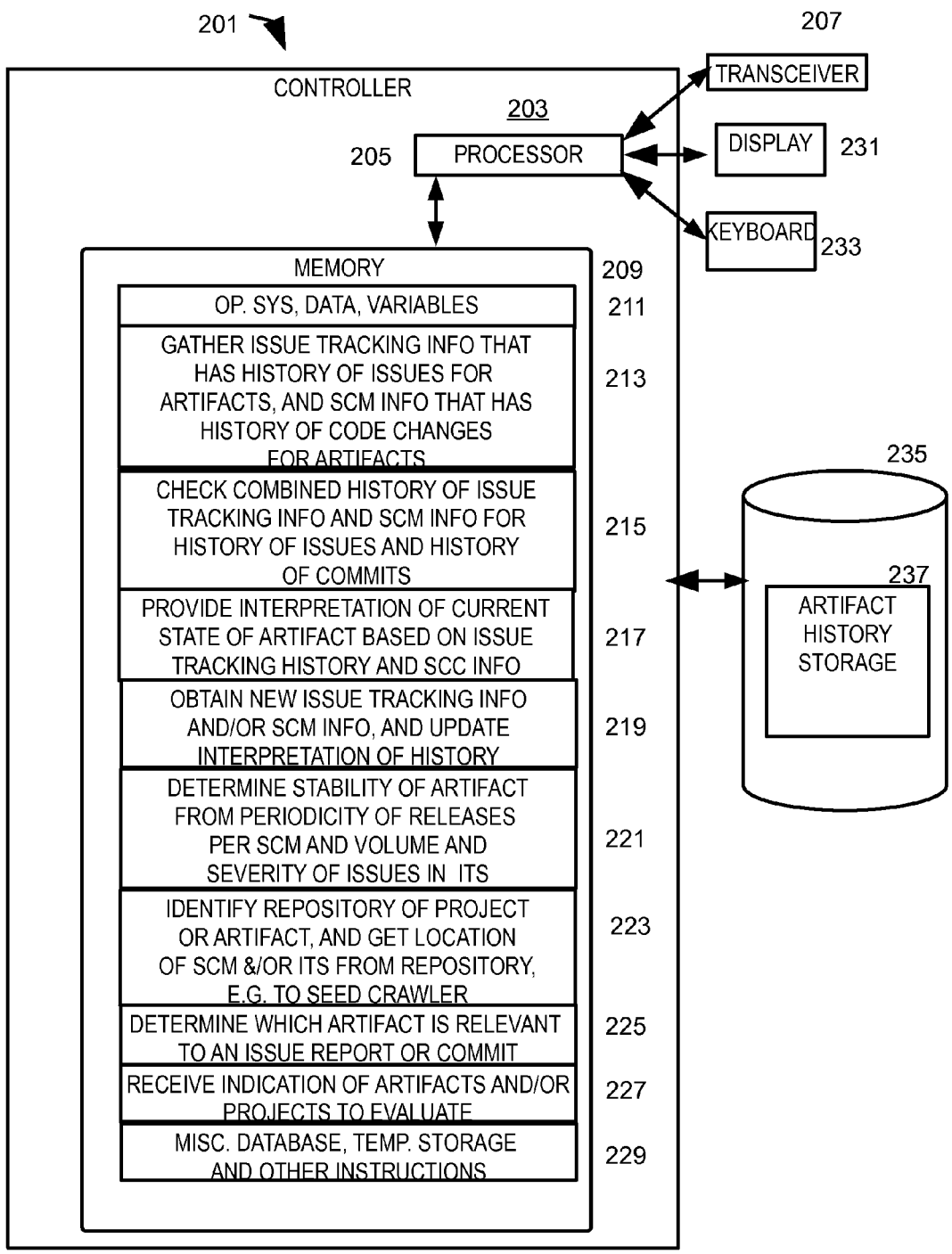
FIG. 2 is a diagram illustrating portions of a computer.

Referring now to FIG. 2, a diagram illustrating portions of a computer will be discussed and described. The computer 201 may include one or more controllers 203, a processor 205, a transceiver 207 for communication with a network (illustrated for example in FIG. 1), a memory 209, a display 231 (optional), and/or a user input device such as a keyboard 233. Alternatively, or in addition to the keyboard 233, a user input device may comprise one or more of various known input devices, such as a keypad, a computer mouse, a touchpad, a touch screen, a trackball, and/or a keyboard. The display 231 may present information to the user by way of a conventional liquid crystal display (LCD) or other visual display, and/or by way of a conventional audible device (e.g., a speaker) for playing out audible messages.

The processor 205 may comprise one or more microprocessors and/or one or more digital signal processors. The memory 209 may be coupled to the processor 205 and may comprise a read-only memory (ROM), a random-access memory (RAM), a programmable ROM (PROM), and/or an electrically erasable read-only memory (EEPROM). The memory 209 may include multiple memory locations for storing, among other things, an operating system, data and variables 211 for programs executed by the processor 205; computer programs for causing the processor to operate in connection with various functions such as to gather 213 issue tracking information and source code management information, check 215 combined history of issue tracking information and source code management information related to the artifact, provide 217 an interpretation of the current state of the artifact based on the IST history and SCM information, obtain 219 new issue tracking information and/or SCM information and update the interpretation of the history of the artifact, determine 221 the stability of the artifact from the periodicity of releases and volume and severity of reported issues, identify 223 the repository of the project or artifact so as to seed the crawler, determine 225 which artifact is relevant to an issue report or commit, and receive 227 an indication of the artifacts and/or projects to evaluate; and a database 229 for other information and/or instructions used by the processor 205. The computer programs may be stored, for example, in ROM or PROM and may direct the processor 205 in controlling the operation of the computer 201. Each of these functions is considered in more detail herein.

The user may invoke functions accessible through the user input device such as the keyboard 233. The user input device may comprise one or more of various known input devices, such as a keyboard (233, illustrated) and/or a pointing device, such as a mouse; the keyboard 233 may be supplemented or replaced with a scanner, card reader, or other data input device; and the pointing device may be a mouse, touch pad control device, track ball device, or any other type of pointing device.

The display 231 is representative of a display that may present information to the user by way of a conventional liquid crystal display (LCD) or other visual display, and/or by way of a conventional audible device for playing out audible messages.

The transceiver 207 is interpreted herein to mean an input/output to the computer 201, such as a network interface to the computer, a receiver and/or a transmitter alone or in combination, or similar.

Responsive to manual signaling from the user input device represented by the keyboard 233, in accordance with instructions stored in memory 209, and/or automatically upon receipt of certain information via the transceiver 207, the processor 205 may direct the execution of the stored programs.

The computer 201 can access an artifact evaluation repository 235 having an artifact history storage 237 on which is stored history of artifacts. The repository 235 can also store a log of evaluation related information listing the artifacts which have been evaluated; and for each artifact: date and time of evaluation (s), a summary of issue tracking history related to each evaluation, and a summary of source code management history related to each evaluation, for example. Although the artifact evaluation repository is illustrated as being accessed locally, it may be configured to be remotely or locally accessible from the computer 201, over a wired or wireless connection. The repository can be formatted using known database or repository techniques.

The processor 205 may be programmed to gather 213 issue tracking information and source code management information. The issue tracking information which is gathered has a history of issues for specific artifacts. The source code management information which is gathered has a history of code changes for specific artifacts. The issue tracking information history can be gathered from the issue tracking system which is associated with the artifact or the project to which the artifact belongs. An issue tracking system provides a programmatic interface that includes, among other things, the ability to query and retrieve a history of the issue tracking for a particular artifact. For example, the JIRA issue tracking system conventionally discloses a command for retrieving a history of a particular artifact or associated with a particular project. Also, a source code management system provides a programmatic interface that includes, among other things, the ability to query and retrieve a history of the source code management for a particular artifact or project. For example, github.com discloses a command for retrieving a history of the source code management for a particular artifact or project. The retrieved information from the IST and/or SCM can include text comments; the content and/or format of the text comments frequently corresponds to known conventions.

Also, the processor 205 can gather other information that relates to the quality of the artifact throughout its lifecycle, and to store that information in the artifact history storage 237. For example, the processor 205 can gather information from project blogs that discuss the artifact or project. A blog entry is conventionally associated with a date when the blog entry was submitted, and may mention an artifact or project by name and may include key words that reflect the quality of the blog. Such blog entry information may be less reliable than issue tracking information and source code management information, since conventions may not be provided for blog entries, or if conventions are provided they may not be followed, or even if conventions are provided the commentary is only as reliable as the commentator. An example blog entry is "We are testing to see if we can reproduce issue #1234 with ArtifactName."

As another example, the processor 205 can gather information from the source code itself. Conventionally, when source code is revised, a source code comment is added that discusses the reason for the source code revision and/or what the source code revision changed. Typically the source code comment is dated, but even if not dated a time-stamp of a difference between versions of code will reveal the date that the source code comment was added. Such source code comment information is typically reliable since it is usually entered by the responsible developer, although conventions for source code comments may be informal at best. An example source code comment is "Revised to fix issue #1234—JOrlina Jan. 1, 2011", perhaps with additional commentary.

As yet another example, the processor 205 can gather information from the project, such as number of developers for the project, number of updates for the project, and the like, which may be indicated in the project log. This information can be added to the information for the artifact, and/or can be used if the same information specific to the artifact is unavailable.

The processor 205 may be programmed to check 215 a combined history of issue tracking information and source code management information related to the artifact. The historical information which is related to one artifact is collected from the returned issue tracking information and the source code management information. The combined history information can include the following: how many times has the code been downloaded historically, how many users are using the code, how many developers historically are updating the code, how many users historically are reporting issues with the code, how many issues historically are reported with the code (optionally grouped by severity), and the like. Also, this information can be evaluated as to whether the numbers are increasing or decreasing. Also, the different histories can be correlated; conveniently, the can be correlated based on dates.

The processor 205 may be programmed to provide 217 an interpretation of the current state of the artifact based on the IST history and SCM information. The interpretation of the current state of the artifact can be provided to a user, for example on the display 231 or transmitted over the transceiver 207. It is the combination of historical information which yields an indication of the quality, rather than the individual statistics and/or the current information which tends to be misleading when evaluated in a vacuum. The processor may be programmed with various rules or policies which interpret the combination of historical information. The rules or policies can be programmed according to known techniques to yield the evaluation. The end evaluation of the artifact can be provided as a rating or ranking or similar, and/or can be provided as an interpretation of various aspects of the code such as stability, popularity, safety, and/or each of these can be provided with an indication of "increasing", "steady" or "decreasing" or similar. This is discussed further below.

The processor 205 may be programmed to obtain 219 new issue tracking information and/or SCM information and update the interpretation of the history of the artifact. For example, the crawler can be programmed to periodically crawl the relevant web sites for updated information. Alternatively, the processor can subscribe to receive an indication when information about an artifact is updated at an ITS or by the SCM, and can use known techniques to obtain the information from the ITS and/or SCM.

In one embodiment, the processor 205 may be programmed to determine 221 the stability of the artifact from the periodicity of releases and volume and severity of reported issues. For example, the ITS and SCM history of the artifact can be evaluated for stability, optionally correlated with other available historical information. In a first example, the releases are at least once a month (for example) as shown by the SCM history, and there are fewer than a predetermined number (such as one) of critical or severe reported issues at any point in its ITS history, then the artifact can be deemed to be stable. That is, it is inferred from the regular release of the artifact that it is being used and updated; because there are not many issues despite the regularity of releases it is further inferred that there is a strong indication that the artifact is stable. In a second example, the commits are infrequent (no more than once a year) and there are fewer than a predetermined number (such as one) of critical or severe reported issues at any point in its ITS history. It is inferred that the artifact is stable but this is a weak indication of stability since the artifact might be dormant. A third example is a variation of the second example, in which the commits are infrequent (no more than once a year) and there are fewer than a predetermined number (such as one) of critical or severe reported issues at any point in its ITS history. However, the third example is combined with historical information from the project log indicating a history of numerous accesses of the artifact which continue. In the third example (compared to the second example), there is a strong inference that the artifact is stable. A fourth example also is a variation of the second example. However, in the fourth example the ITS history shows that a critical vulnerability has not been fixed since the last commit. Hence, the weak inference is that the artifact is stable and the strong inference is that there is an unresolved severe issue.

The processor 205 may be programmed to identify 223 the repository of the project or artifact and obtain the location of the SCM and/or the ITS for the artifact from the repository, so as to seed the crawler or otherwise indicate where to obtain the SCM and ITS information. The project to which the article belongs and hence the repository of the article can be identified in accordance with known techniques. Then, the location of the SCM and the location of the ITS for the artifact (or for the project to which the artifact belongs) can be obtained from the repository. Typically, the respective locations of the SCM and the ITS are different from each other. Typically, the location is provided as a URL. The URL can be used to seed the crawler in accordance with known techniques. Where a deep database search is to be used to obtain the SCM and/or ITS information, the crawler or database program can be provided with additional directory information. Credentials (such as log-in, password, authentication, or the like) can be provided for the deep database search, when necessary.

The processor 205 may be programmed to determine 225 which artifact is relevant to an issue report or commit. Generally, a commit conventionally identifies the artifact associated with the commit. However, an issue report can be made before the associated artifact has been determined, such as when an issue (perhaps a bug) is initially reported. An issue report can eventually be tied to an artifact, and the issue report can be extrapolated back in time to be relevant to the artifact as early as the initial report of the issue. It can be more difficult to determine from a project blog or source code storage which issue and/or commit to tie to an artifact. Generally, the text can be parsed for the name of the artifact or the issue identifier and the date of the comment or blog entry, and the text can be parsed for key words that reflect on the activity such as "critical error" or "fixed".

The processor 205 may be programmed to receive 227 an indication of the artifacts and/or projects to evaluate. The artifacts and/or projects to evaluate can be provided in an internally maintained list, can be provided by manual entry from user input via the keyboard 233, or similar.

As will be understood in this field, besides the functions discussed above, the memory 211 can include other miscellaneous information in a misc. database 247, along with the usual temporary storage and other instructions for other programs not considered herein.

The computer 201 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 205, memory 211, a disk drive and/or removable storage medium are referred to as "computer-readable storage media" and provide non-transitory storage of computer programs and data.

It should be understood that FIG. 2 is described in connection with logical groupings of functions or resources. One or more of these logical groupings may be omitted from one or more embodiments or can be on a distributed system, for example, the functionality of gather 213 the issue tracking information and SCM information can be omitted and/or performed on a different processor. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

Figure 3:
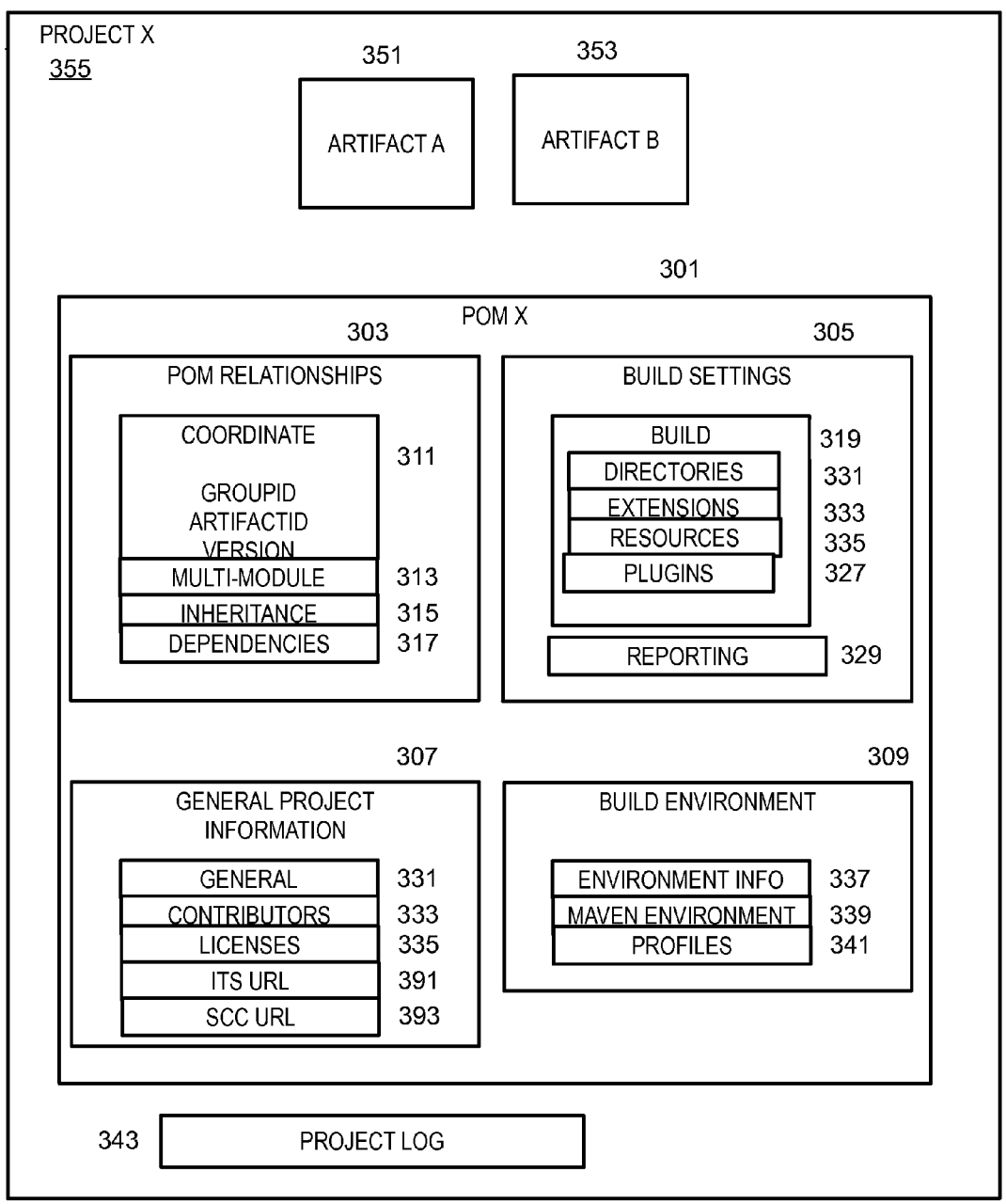
FIG. 3 is a block diagram illustrating relevant portions of a project object model.

Referring now to FIG. 3, a block diagram illustrating relevant portions of a project object model will be discussed and described. The project, e.g., project X 355 includes one or more artifacts (here represented by Artifacts A and B 351, 353), the project log 343 for Project X, and metadata for the project X (here represented by POM X 301) that identifies project information such as contributors 333 and licenses 335. The illustrated example is a known Maven software (currently available at Apache) project object model, which provides a highly structured handling of projects and artifacts; a discussion of relevant portions is provided while other less relevant and known information is omitted. Maven is a build management tool that comprises a project object model ("POM"), a set of standards, a project lifecycle, a dependency management system, and logic for executing plugin goals at defined phases in a lifecycle.

A "Project Object Model" (POM), e.g., POM X 301 is a file provided for a project 355 that describes configures and customizes an application and is associated with one or more artifacts by being included in the same directory as one or more artifacts. In different build tools or project management tools, the POM 301 is a file included in a project, e.g., project X 355, which includes one or more artifacts (represented by artifact A and artifact B 351, 353); the POM can be a file with a pre-determined name: a Maven pom.xml file, a GNU Makefile, or an Ant build.xml file. The POM file is typically targeted to Java applications, building JAR artifacts, or the like. A software artifact can be associated with a POM in alternative ways, for example, by including a link or identification of the associated POM.

The POM 301 can contain description data and configuration data: POM relationships 303, build setting 305, general project information 307, and build environment 309. These are discussed in more detail. General project information 307 includes general data 331 (project's name, the URL for a project, the sponsoring organization), a list of developers and contributors 333, the license (or identifiers of licenses) for the project 355, the URL of the issue tracking system for the project 391, and the URL of the source code management system for the project 393. The ITS URL 391 and the SCM URL 393 can be accessed to determine where the ITS and SCM for the artifacts in the project are located.

The build settings 305 for the project 355 customize the behavior of a build 319 by specifying location of directories 321, extensions 323, resources 325 and plugins 327. Also, the build settings 305 can specify reporting 329 to be used for the POM 301.

The build environment 309 comprises settings and profiles that can be activated when the software comprising the artifacts 351 is built for use in different environments. For example, during development the built software is deployed to a development server, whereas in production developers the built software is deployed to a production server. This example provides build environment information 337, Maven environment information 339, and profiles 341 to be used in different builds. Techniques for executing a build of software are known.

The POM relationships 303 include POM coordinates 311 that specify a group ID, an artifact ID, and a version number for the project 355 and for the POM 301. In the conventional Maven system, group ID, artifact ID and version (GAV) uniquely identify each artifact. The group ID is meant to identify the individual or organization that published the artifact. The artifact ID uniquely identifies an artifact for the Group, and in accordance with known techniques indicates what functionality the artifact is addressed to; artifact IDs need not be unique for different groups. The version is the temporal axis for how an artifact changes in accordance with known techniques, e.g., Version 1.0 is least mature, and Version 8.2.3 is more mature. Collectively, the group ID, artifact ID and version number are sometimes referred to herein as the "GAV", "Maven coordinate" or "GAV coordinate". The GAV uniquely identifies an artifact and allows its dependencies and relationship to other artifacts to be tracked. The use of the GAV disambiguates amongst artifacts across various domains of different groups.

Since each artifact 351, 353 is associated with the metadata, i.e., the information in the POM 301, the user can be provided with very targeted information. For example, a user can be informed that a particular artifact has not been updated for a long time or has security vulnerabilities to be fixed.

The POM as used in Maven is discussed in "MAVEN: The Complete Reference Guide", Edition 8 (2010). In a well-written POM, there is a block for "description," "project", "URL", "License", "Issue tracking", "author list" and the like. Known techniques can be used to construct a POM.

A project, e.g., project X 355 can have a parent, e.g., project Y 357. Project Y 357 is illustrated to include representative artifact C 359 and a POM Y 361. Values which are not specified in the POM in a child project can inherit values from the POM of a parent project, e.g., when general project information 307 is not specified in the POM X 301 of Project X 355, the project X 355 can inherit the general project information specified in the POM Y 361 of the parent project Y 357.

Also included in a project 355 is a project log 343. The project log 343 can perform known functions, such as recording source code check-in, who checked it in, why it was checked-in; recording source code check-out, who checked it out, why it was checked-out; recording update of an artifact, who updated it, from what sponsor, and why it was updated; recording a download of an artifact from the project, who downloaded it, and to where; tracking issues such as bugs and related fixes specifying artifacts which were fixed); and similar. Any and all of the foregoing are considered to be an activity. Typically the log includes a time stamp for each activity. This information may be divided between more than one file, which together can be considered to be a project log. Techniques for maintaining a project log are known in the industry.

A simple example of a POM follows:

```
<project>
    <!-- model version is 4.0.0 for Maven 2.x POMs -->
    <modelVersion>4.0.0</modelVersion>
    <!-- project coordinates, i.e. a group of values which uniquely
    identify this project -->
    <groupId>com.mycompany.app</groupId>
    <artifactId>my-app</artifactId>
    <version>1.0</version>
    <!-- library dependencies -->
    <dependencies>
        <dependency>
            <!-- coordinates of the required library -->
            <groupId>junit</groupId>
            <artifactId>junit</artifactId>
            <version>3.8.1</version>
            <!-- this dependency is only used for running and compiling
            tests -->
            <scope>test</scope>
        </dependency>
    </dependencies>
</project>
```

It is not necessary to use a POM structure according to Maven; alternative implementations of a project which include artifacts and a project log will be appreciated.

A POM or equivalent structure can include an identification of a source code management system 393 (such as a URL) and/or an identification of an issue tracking system 391 (such as another URL). A developer that commits an artifact to the project can access the identification of the source code management system in the POM so as to use the appropriate SCM system to record information about the artifact which is being committed. Also, a developer that addresses an issue with an artifact or project can access the identification of the issue tracking system in the POM so as to use the appropriate issue tracking system to record information about an issue with the artifact or project.

Figure 4A:
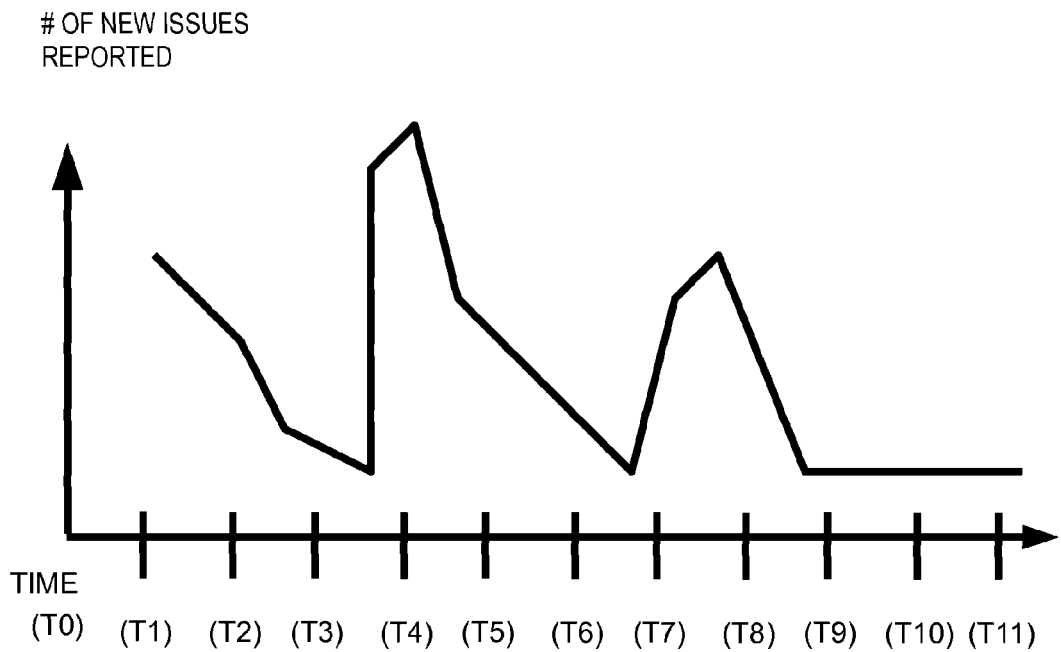
FIG. 4A to FIG. 4E are graphs visually illustrating an example history of an artifact.
Figure 4B:
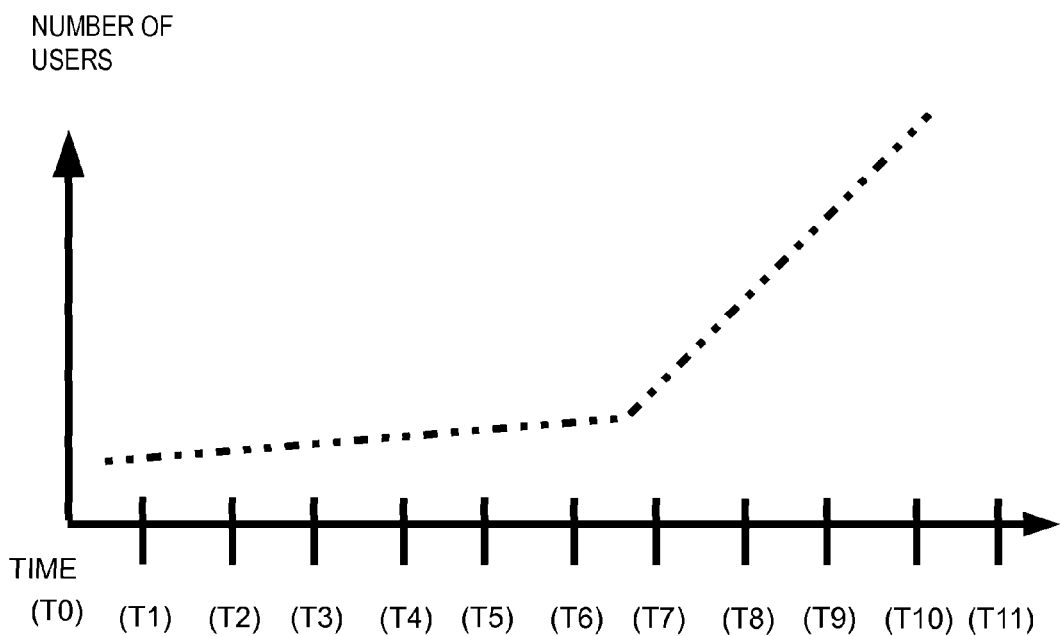
Figure 4C:
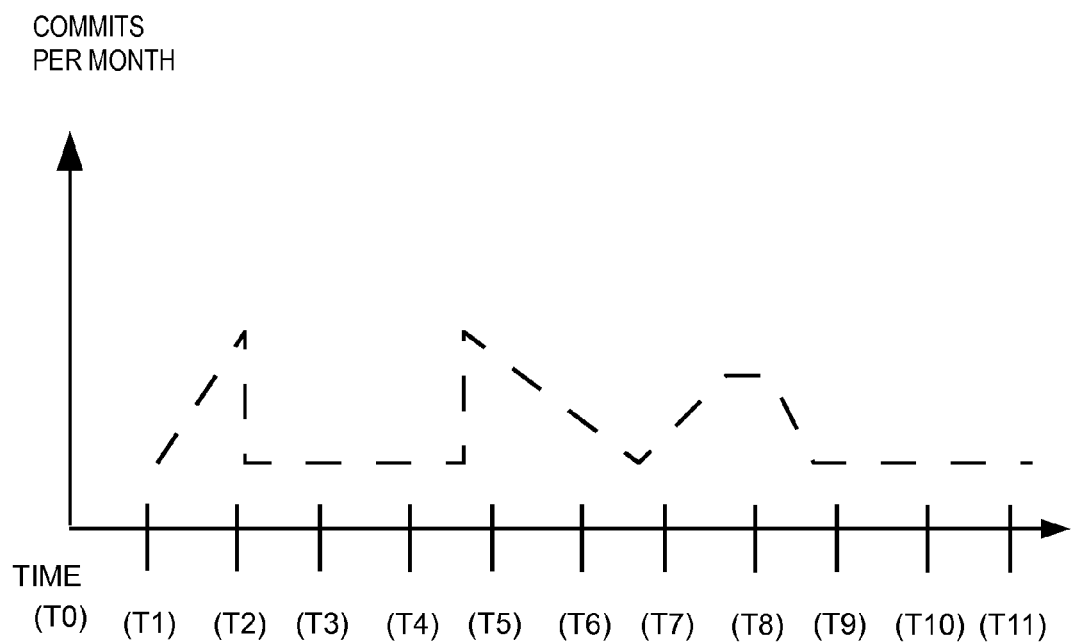
Figure 4D:
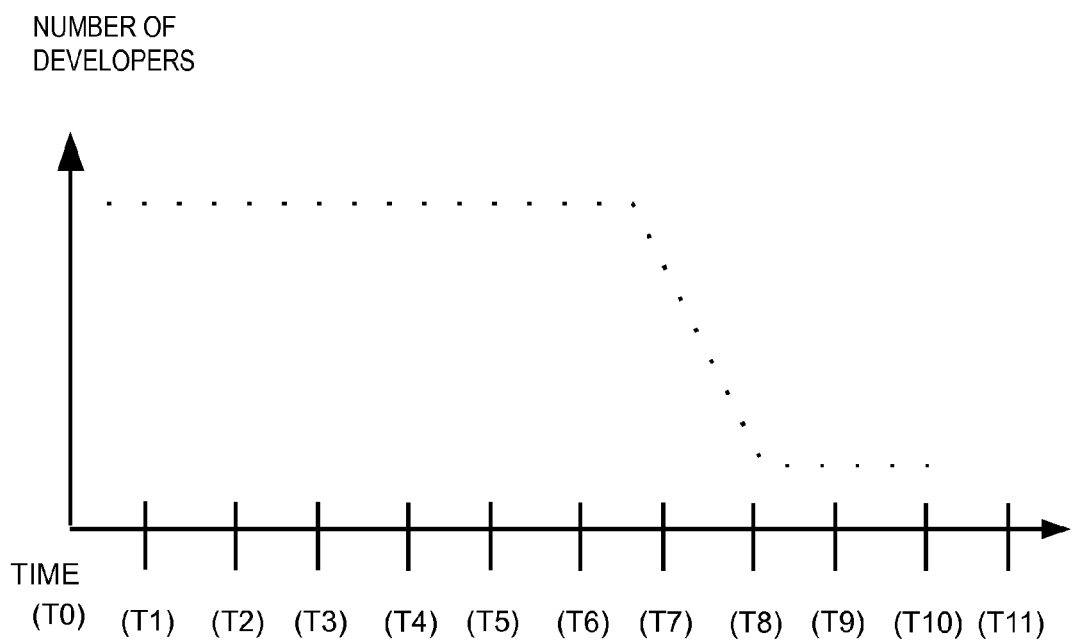
Figure 4E:
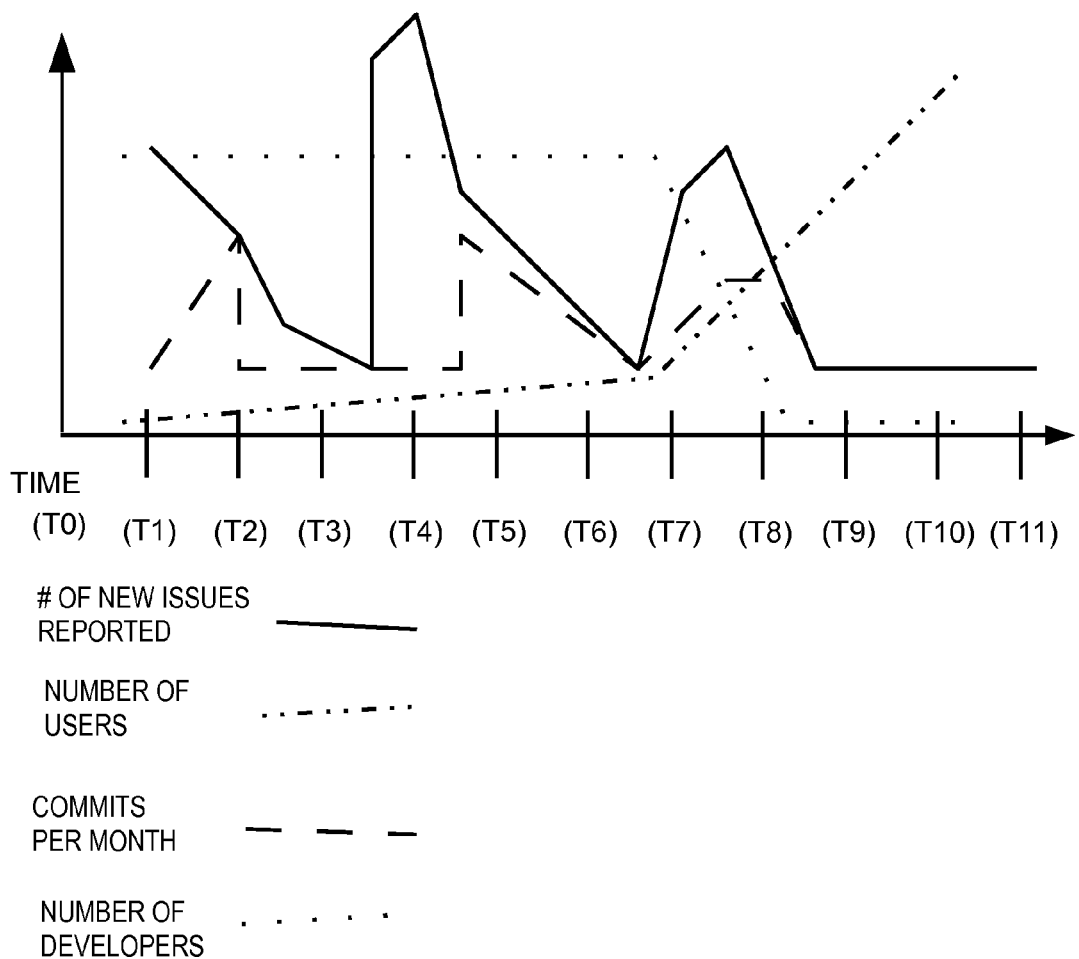

Referring now to FIG. 4A to FIG. 4E, graphs visually illustrating an example history of an artifact will be discussed and described. In these graphs, the x-axis represents time in predetermined increments from T0 to T11; the time increment can be, e.g., 1 day, 1 week, or 1 month, or variations. The y-axis represents in FIG. 4A to FIG. 4D, respectively, number of new issues reported, number of users, commits per month, and number of developers. In FIG. 4E, the combined histories are visually represented.

In FIG. 4A, the number of new issues with the artifact reported over time is obtained from the ITS which has historical information about issues for the artifact. In this example, the number repeatedly increases and decreases over time.

In FIG. 4B, the number of users is obtained from the SCM or project log from the number of downloads of the artifact. The number of users gradually increases to T7, when the slope increases sharply.

In FIG. 4C, a history of the number of commits per month is obtained from the SCM relevant to the artifact. The number of commits repeatedly increases and decreases over time.

In FIG. 4D, the number of developer is steady from T0 to T8, when the number drops sharply.

In FIG. 4E, the respective times for the information obtained from the ITS and the SCM (and the project log) are aligned. A number of statistical analyses can be made from the combinations. For example, it can be seen that the curve of the number of commits roughly follows the curve of the number of new issues, with some delay. The inference is that the code is normal. Also, it can be seen that the number of new issues reported vs. the number of users shows that the number of new issues has leveled off despite an increasing number of users. The strong inference is that the code is stable, since more users typically means more opportunities to discover and report issues with the code. Also, it can be seen that the current number of new issues reported has leveled off at a low level and the number of commits per month is similarly at a low level. This is a weak inference that the code is stable. Further, it can be seen that the number of developers and the number of new issues reported have both similarly decreased. This is a weak inference that the code is stable. In overall combination of the history, however, the increasing number of users (increasing popularity) enhances the inference of code stability (fewer commits, fewer new issues).

In order to provide an evaluation, rankings can be assigned for number of new issues reported, an inference of stability (or lack thereof) can be enhanced by the number of users, an inference of stability can be reduced when the number of commits per month exceeds a pre-determined number, an inference of reliability can be reduced as the number of developers increases, or similar.

The example in FIG. 4A to FIG. 4E is provided to illustrate that neither the ITS nor the SCM information alone provides sufficient information to infer the quality of a product. For example, a top quality but popular artifact which has many commits may have an ITS history with significantly more issues reported than a lower quality but less popular artifact. As another example, an artifact which does not have any new issues reported may be dormant (few to no commits) because there is a security risk which is not fixed (as reflected in the ITS history); a competing artifact may which is actively being developed (as reflected by number of commits in the SCM history) despite having a few new issues reported (as reflected in the ITS history) is likely a better quality.

Referring now to FIG. 5, a flow chart illustrating a procedure to evaluate a software artifact will be discussed and described. The procedure can advantageously be implemented on, for example, a processor of a controller, described in connection with FIG. 2 or other apparatus appropriately arranged. Information which has already been discussed herein may be omitted to avoid unnecessary repetition.

In overview, FIG. 5 illustrates that the procedure 501 to evaluate a software artifact includes two separate processes, to obtain 503 historical information for the artifact, and to interpret 513 the historical information for the software artifact. One of skill in this field will recognize that the processes may be combined if desired.

The procedure to obtain 503 historical information for the artifact(s) includes obtaining 505 the URL for the issue tracking system and the URL for the source code management from the repository for the artifact (or from the repository for the project to which the artifact belongs). Then, the procedure gathers 507 issue tracking information from the issue tracking system at the URL. Also, the procedure gathers 509 source code management information from the source code management system at the URL. Note, when the procedure gathers the SCM and/or ITS information for the artifact, the procedure frequently gathers SCM and/or ITS information for other artifacts, such as for plural artifacts that all belong to the same project. Consequently, before attempting to gather information for the next artifact to be evaluated, the procedure 503 checks whether such SCM and/or ITS information for the next artifact was already gathered in this pass. Then, the procedure 503 will get 511 the next artifact listed for which the ITS or SCM information has not already been crawled, and loop to proceed to obtain the information for the next artifact.

The procedure 503 to obtain the historical information for the artifacts can be implemented to loop periodically through a list of artifacts or through a list of URLs, so as to crawl the URLs for the artifacts which are evaluated. In another implementation, the procedure 503 is implemented to obtain the historical information for only specific artifacts or projects, such as on-demand when requested by a user or when an indication is received that an issue was received or source code was updated.

The procedure to interpret 513 historical information for software artifact(s) includes checking 515 the combined history of the issue tracking information and source code management information with respect to the particular artifact. Then, the procedure provides 517 or updates the interpretation of the current state of the artifact based on the combined history for the artifact, as previously described. Then, the procedure 513 can get 519 the next artifact to evaluate, and loop back to evaluate the next artifact. For example, the artifacts to be evaluated can be input by a user as part of a request and the next artifact in the list can be evaluated. Alternatively, the artifacts can be evaluated (or re-evaluated) when their historical information is updated.

The discussion herein refers to a "commit" or "committing". As an example of a commit, consider conventional Git "commit" command which records a manifest of the files in the project at that time on a SCM storage. As is known, the commit command records the user name and e-mail address together with the commit, a commit message for the changes, together with the manifest of the file(s) which were committed. A conventional Git "log" command can be used to obtain commits in a project history.

The discussion herein refers to an "issue". An issue could represent a software bug, a project task, a helpdesk ticket, or similar. An "issue" is associated with a project to which the issue belongs, an identifier within the issue tracking system that uniquely identifies the issue, a summary of the issue, a type of the issue (e.g., bug, improvement, new feature task, other), a status of the issue that indicates the stage the issue is currently at in its lifecycle (e.g., open, in progress, resolved, reopened, closed), a priority indicating a relative importance of the issue (e.g., highest priority, critical, major, minor, trivial), and a resolution of the issue indicating if the issue is resolved or closed (e.g., fixed, won't fix, duplicate, incomplete, cannot reproduce). Conventional techniques can be used to retrieve a history of changes to an issue in an issue tracking system such as Jim; the history can indicate the fields and their values which were changed in an issue.

The discussion herein refers to "metadata". Metadata can be collected from various, disparate sources, whether from the artifacts stored in the repository itself (e.g., last modified timestamp on the artifact file), the project log for the project which includes the artifact, from publicly available third-party sources (e.g. cve.mitre.org, who publishes vulnerability information), or from the outputs of metric processes that can be run on the artifacts that are housed in the repository (e.g. a file scanner looks for binary incompatibilities between an artifact's current version and the version(s) prior).

Software projects, more particularly open source software projects, conventionally collect information about project "activity," and/or artifact "activity," which reflects whether an artifact is kept up to date (i.e., recently updated), whether it is being actively developed (i.e., lots of recent activity). This is particularly true where the software source code is open source, which controls use of artifacts so that the project log must reflect the activity.

Security risk of a software artifact is referred to herein, and generally encompasses software vulnerabilities and security. The Mitre CVE (Common Vulnerabilities and Exposures) list and NIST NVD (National Vulnerability Database) and other organizations conventionally provide text information about vulnerabilities and security of commercial software applications. However, the CVE list and NVD database indicate commercial software application names and versions or version ranges which do not readily map to software artifact coordinates. Furthermore, the CVE and NVD rating of vulnerabilities is based on the seriousness of the vulnerability.

Licenses are referred to herein. Well known in the open source field is that a license can be associated with an artifact. The method or system can collect the identity of the license or the content of the license, which is listed for example in the project such as in the POM associated with the artifact. The license further can be normalized to indicate permitted and prohibited activities. (There are a several pre-determined open-source licenses in common use as well as variations thereof, as well as some customized licenses.) The license (which permits or prohibits certain activities) can be scored against what the user intends to do with the software, as further discussed herein.

The open source world tends to make available high-level descriptions down to low-level walk through guides. This documentation can be conventionally published in association with the open source code software artifacts. Keywords can be extracted from the documentation and can be useful for searching and categorization and the like since they tend to describe how code is used, and what it can be used with.

The detailed descriptions which appear above may be presented in terms of program procedures executed on a computer or network of computers. These procedural descriptions and representations herein are the means used by those skilled in the art to most effectively convey the substance of their work to others skilled in the art.

Further, an embodiment has been discussed in certain examples as if it is made available by a provider to a single customer with a single site. An embodiment may be used by numerous users, if preferred, and the users can be at one or more sites.

The system used in connection herewith may rely on the integration of various components including, as appropriate and/or if desired, hardware and software servers, applications software, database engines, server area networks, firewall and SSL security, production back-up systems, and/or applications interface software.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the present invention contemplates the use of an operator to access the invention, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will appear from the description given herein.

Furthermore, the communication networks of interest include those that transmit information in packets, for example, those known as packet switching networks that transmit data in the form of packets, where messages can be divided into packets before transmission, the packets are transmitted, and the packets are routed over network infrastructure devices to a destination where the packets are recompiled into the message. Such networks include, by way of example, the Internet, intranets, local area networks (LAN), wireless LANs (WLAN), wide area networks (WAN), and others. Protocols supporting communication networks that utilize packets include one or more of various networking protocols, such as TCP/IP (Transmission Control Protocol/Internet Protocol), Ethernet, X.25, Frame Relay, ATM (Asynchronous Transfer Mode), IEEE 802.11, UDP/UP (Universal Datagram Protocol/Universal Protocol), IPX/SPX (Inter-Packet Exchange/Sequential Packet Exchange), NetBIOS (Network Basic Input Output System), GPRS (general packet radio service), I-mode and other wireless application protocols, and/or other protocol structures, and variants and evolutions thereof. Such networks can provide wireless communications capability and/or utilize wireline connections such as cable and/or a connector, or similar.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer system, comprising:
    a transceiver operable to transmit and receive communications over at least a portion of a network; and
    a processor cooperatively operable with the transceiver, and configured so that the processor:
    obtains a URL for an issue tracking storage system and a URL for a location of a source code management storage system;
    gathers, by communication over the transceiver, (i) from the URL of the issue tracking storage system, issue tracking information stored in the issue tracking storage system, the issue tracking information having a history of issues filed against a plurality of artifacts, and (ii) from the URL of the source code management storage system, source code management information stored in the source code management storage system, the source code management information having a history of code changes committed against another plurality of artifacts;
    determines a history of the issue tracking information for a history of issues which are targeted to a single artifact, and determines the source code management information for a history of commits and corresponding source code changes which are committed against the single artifact;
    provides an interpretation of the current state of the single artifact based on the history of the issue tracking information targeted to this single artifact and the history from the source code management information committed against the single artifact;
    wherein the interpretation of the current state by the processor is an evaluation of the current stability, so that the processor further determines a stability of the single artifact from a periodicity of releases of the single artifact in the source code management information and a volume and severity of issues reported for the single artifact in the issue tracking information, wherein
    the single artifact is determined to be stable when the single artifact has regular periodic releases and fewer than a first predetermined number of severe issues, and
    the single artifact is determined to be not stable when the single artifact has more than a second predetermined number of severe issues, the second predetermined number being more than the first predetermined number.

2. The computer system of claim 1, wherein the processor further updates the interpretation of the history for the single artifact as new issue tracking information and source code management information is obtained.

3. The computer system of claim 1, wherein the processor further
    obtains an indication of artifacts for which a history is to be interpreted,
    identifies a software repository of a software project to which each of the artifacts belongs,
    and obtains an indication of where the issue tracking storage system for each artifact is located from the software repository of the software project to which each artifact belongs.

4. The computer system of claim 1, wherein the processor further
    obtains an indication of artifacts for which a history is to be interpreted,
    identifies a software repository of a software project to which each of the artifacts belongs, and
    obtains an indication of where the source code management storage system for each artifact is located from the software repository of the software project to which each artifact belongs.

5. The computer system of claim 1, wherein the processor further
    determines the single artifact which is relevant to one issue report of the issue tracking information based on a detailed explanation provided with the issue report, and
    determines the single artifact which is relevant to one commit in the source code management information based on comments in a commit log associated with the commit.

6. The computer system of claim 1, wherein the single artifact is stored in the software repository according to the Open Source Definition, the software repository being an open source repository.

7. A computer-implemented method for evaluating a software artifact, comprising:
    obtaining, by a processor, a URL for an issue tracking storage system and a URL for a location of a source code management storage system;
    gathering, in the processor by communication over a transceiver, (i) from the URL of the issue tracking storage system, issue tracking information stored in the issue tracking storage system, the issue tracking information having a history of issues filed against a plurality of artifacts, and (ii) from the URL of the source code management storage system, source code management information stored in the source code management storage system, the source code management information having a history of code changes committed against another plurality of artifacts;
    determining a history of the issue tracking information for a history of issues which are targeted to a single artifact, and determines the source code management information for a history of commits and corresponding source code changes which are committed against the single artifact;
    providing an interpretation of the current state of the single artifact based on the history of the issue tracking information targeted to the single artifact and the history from source code management information committed against the single artifact;
    wherein the interpretation of the current state is an evaluation of the current stability further comprising determining a stability of the single artifact from a periodicity of releases of the single artifact in the source code management information and a volume and severity of issues reported for the single artifact in the issue tracking information, wherein the single artifact is determined to be stable when the single artifact has regular periodic releases and fewer than a first predetermined number of severe issues, and the single artifact is determined to be not stable when the single artifact has more than a second predetermined number of severe issues, the second predetermined number being more than the first predetermined number.

8. The computer-implemented method of claim 7, further comprising updating the interpretation of the history for the single artifact as new issue tracking information and source code management information is obtained.

9. The computer-implemented method of claim 7, further comprising
obtaining an indication of artifacts for which a history is to be interpreted,
identifying a software repository of a software project to which each of the artifacts belongs,
and obtaining an indication of where the issue tracking storage system for each artifact is located from the software repository of the software project to which each artifact belongs.

10. The computer-implemented method of claim 7, further comprising
obtaining an indication of artifacts for which a history is to be interpreted,
identifying a software repository of a software project to which each of the artifacts belongs, and
obtaining an indication of where the source code management storage system for each artifact is located from the software repository of the software project to which each artifact belongs.

11. The computer-implemented method of claim 7, further comprising
determining the single artifact which is relevant to one issue report of the issue tracking information based on a detailed explanation provided with the issue report, and
determining the single artifact which is relevant to one commit in the source code management information based on comments in a commit log associated with the commit.

12. A non-transitory computer-readable medium storing instructions for executing the method of claim 7.

13. A non-transitory computer-readable medium comprising instructions for execution by a computer, the instructions including a computer-implemented method for evaluating a software artifact, the instructions for implementing:
obtaining, by a processor, a URL for an issue tracking storage system and a URL for a location of a source code management storage system;
gathering, in the processor by communication over a transceiver, (i) from the URL of the issue tracking storage system, issue tracking information stored in the issue tracking storage system, the issue tracking information having a history of issues filed against a plurality of artifacts, and (ii) from the URL of the source code management storage system, source code management information stored in the source code management storage system, the source code management information having a history of code changes committed against another plurality of artifacts;

determining a history of the issue tracking information for a history of issues which are relevant to a single artifact, and determining the source code management information for a history of commits and corresponding source code changes which are committed against the single artifact;

providing an interpretation of the current state of the single artifact based on the history of the issue tracking information targeted to the single artifact and the history from the source code management information committed against the single artifact;

wherein the interpretation of the current state is an evaluation of the current stability further comprising instructions for determining a stability of the single artifact from a periodicity of releases of the single artifact in the source code management information and a volume and severity of issues reported for the single artifact in the issue tracking information, wherein the single artifact is determined to be stable when the single artifact has regular periodic releases and fewer than a first predetermined number of severe issues, and the single artifact is determined to be not stable when the single artifact has more than a second predetermined number of severe issues, the second predetermined number being more than the first predetermined number.

14. The non-transitory computer-readable medium of claim 13, further comprising instructions for updating the interpretation of the history for the single artifact as new issue tracking information and source code management information is obtained.

15. The non-transitory computer-readable medium of claim 13, further comprising instructions for
obtaining an indication of artifacts for which a history is to be interpreted,
identifying a software repository of a software project to which each of the artifacts belongs,
and obtaining an indication of where the issue tracking storage system for each artifact is located from the software repository of the software project to which each artifact belongs.

16. The non-transitory computer-readable medium of claim 13, further comprising instructions for
obtaining an indication of artifacts for which a history is to be interpreted,
identifying a software repository of a software project to which each of the artifacts belongs, and
obtaining an indication of where the source code management storage system for each artifact is located from the software repository of the software project to which each artifact belongs.

17. The non-transitory computer-readable medium of claim 13, further comprising instructions for
determining the single artifact which is relevant to one issue report of the issue tracking information based on a detailed explanation provided with the issue report, and
determining the single artifact which is relevant to one commit in the source code management information based on comments in a commit log associated with the commit.

18. The non-transitory computer-readable medium of claim 13, wherein the single artifact is stored in the software repository according to the Open Source Definition, the software repository being an open source repository.

* * * * *